US012238205B1

(12) United States Patent
Delaney et al.

(10) Patent No.: US 12,238,205 B1
(45) Date of Patent: *Feb. 25, 2025

(54) METHOD OF PROVIDING SECURE COMMUNICATIONS TO MULTIPLE DEVICES AND MULTIPLE PARTIES

(71) Applicant: Cyber IP Holdings, LLC, Herndon, VA (US)

(72) Inventors: Christopher Edward Delaney, Front Royal, VA (US); Chava Louis Jurado, Leesburg, VA (US); Carl Bailey Jacobs, Fredericksburg, VA (US); Jeremiah MacDonald, Greenville, SC (US); Michael Vincent Chest, Taylors, SC (US); Walter Adeyinka Ademiluyi, Boyds, MD (US)

(73) Assignee: Cyber IP Holdings, LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,971

(22) Filed: May 16, 2022

Related U.S. Application Data

(63) Continuation of application No. 16/401,498, filed on May 2, 2019, now Pat. No. 11,349,646.
(Continued)

(51) Int. Cl.
*H04L 9/08* (2006.01)
*H04L 9/06* (2006.01)
(Continued)

(52) U.S. Cl.
CPC ............ *H04L 9/083* (2013.01); *H04L 9/0643* (2013.01); *H04L 9/0822* (2013.01);
(Continued)

(58) Field of Classification Search
CPC ..... H04L 9/083; H04L 9/0643; H04L 9/0822; H04L 9/0827; H04L 9/14; H04L 63/0435; H04L 9/3247
See application file for complete search history.

(56) References Cited

U.S. PATENT DOCUMENTS

| 8,447,983 B1 | 5/2013 | Beck et al. |
| 8,971,539 B2 | 3/2015 | Pandrangi et al. |
| (Continued) | | |

OTHER PUBLICATIONS

Van Besien, William; Dynamic, Non-Interactive Key Management for the Bundle Protocol; Proceedings of the 5th ACM Workshop on Challenged Networks; pp. 75-78; Sep. 2010.
(Continued)

*Primary Examiner* — Carl G Colin
*Assistant Examiner* — Zhe Liu
(74) *Attorney, Agent, or Firm* — Jones Day

(57) ABSTRACT

Systems and methods for automatically disseminating a private key are presented. A first message requesting a key proxy instance is received from a first user device. The first message comprises a first symmetric key. A key proxy server is directed to allocate a key proxy instance for communication with the first user device based on a device public key that corresponds to the first user device. A unique URL corresponding to the key proxy instance is received from the key proxy server. A second message comprising the unique URL is sent to the first user device. The second message is encrypted using the first symmetric key and signed using a server private key. A third message comprising the URL of the key proxy instance is received from the first user device and forwarded to a second user device.

19 Claims, 23 Drawing Sheets

Related U.S. Application Data

(60) Provisional application No. 62/666,424, filed on May 3, 2018.

(51) Int. Cl.
   *H04L 9/14* (2006.01)
   *H04L 9/40* (2022.01)

(52) U.S. Cl.
   CPC .............. *H04L 9/0827* (2013.01); *H04L 9/14* (2013.01); *H04L 63/0435* (2013.01)

(56) References Cited

U.S. PATENT DOCUMENTS

| | | | |
|---|---|---|---|
| 9,479,328 B1* | 10/2016 | Wilburn | H04L 9/0822 |
| 9,921,894 B1* | 3/2018 | O'Kennedy | G06F 9/541 |
| 10,263,789 B1 | 4/2019 | Popoveniuc et al. | |
| 2001/0055396 A1 | 12/2001 | Jevans | |
| 2003/0147536 A1 | 8/2003 | Andivahis et al. | |
| 2006/0013400 A1* | 1/2006 | Sutton, II | H04L 9/0897 380/278 |
| 2008/0065878 A1 | 3/2008 | Hutson et al. | |
| 2010/0161966 A1* | 6/2010 | Kwon | H04L 9/3273 380/278 |
| 2011/0072264 A1 | 3/2011 | McNulty | |
| 2011/0261964 A1* | 10/2011 | Kahler | H04L 9/083 380/44 |
| 2013/0145173 A1 | 6/2013 | Shablygin et al. | |
| 2013/0167209 A1 | 6/2013 | McBride et al. | |
| 2014/0052989 A1 | 2/2014 | Jones et al. | |
| 2014/0181513 A1* | 6/2014 | Marek | H04L 63/105 713/168 |
| 2014/0215210 A1 | 7/2014 | Wang et al. | |
| 2015/0381588 A1 | 12/2015 | Huang et al. | |
| 2016/0224799 A1 | 8/2016 | Uzun et al. | |
| 2016/0380768 A1* | 12/2016 | Koike | H04L 9/30 380/277 |
| 2017/0012949 A1* | 1/2017 | Boren | H04L 63/045 |
| 2017/0019380 A1* | 1/2017 | Dover | H04L 9/0825 |
| 2017/0155628 A1* | 6/2017 | Rohloff | H04L 63/02 |
| 2018/0083938 A1 | 3/2018 | Kim et al. | |
| 2018/0115551 A1* | 4/2018 | Cole | H04L 47/783 |
| 2018/0212771 A1 | 7/2018 | Howell et al. | |
| 2019/0014094 A1 | 1/2019 | Le Saint | |
| 2019/0124058 A1* | 4/2019 | Kawahara | H04L 9/32 |
| 2019/0297065 A1 | 9/2019 | Kanungo et al. | |
| 2019/0305940 A1* | 10/2019 | Bhabbur | H04L 9/3226 |
| 2020/0367306 A1* | 11/2020 | Wang | H04L 63/0884 |
| 2021/0111880 A1* | 4/2021 | Ren | G06F 21/62 |

OTHER PUBLICATIONS

Chuah, Chai Wen; Dawson, Edward, Simpson, Leonie; Key Derivation Function: The SCKDF Scheme; IFIP International Information Security Conference; pp. 125-126; Jul. 2013.

* cited by examiner

METHOD OF PROVIDING SECURE COMMUNICATIONS TO MULTIPLE DEVICES AND MULTIPLE PARTIES

CROSS-REFERENCE TO RELATED APPLICATIONS

This application is a continuation application of U.S. patent application Ser. No. 16/401,498, filed May 2, 2019, which claims priority to U.S. Provisional Application No. 62/666,424, filed May 3, 2018, both of which are incorporated herein by reference in their entireties.

TECHNICAL FIELD

The technology described herein relates to secure communications and more particularly to secure communications channels between users.

BACKGROUND

Private key cryptography that uses Diffie-Hellman (DH)-style or RSA-style key exchange to secure and validate person-to-person communications, has been available since 1991, i.e., Pretty Good Privacy (PGP). A free software implementation of private key cryptography, i.e., GNU Privacy Guard (GPG), has been freely accessible to anyone with a computer since 1999.

Public-key encryption that uses DH/RSA-style key exchange to share public keys can be used to secure one-time or ongoing communications between two parties across a monitored network, without risk of being compromised. This method of encryption is employed within modern standards such as HyperText Transfer Protocol/Secure (HTTPS), which secures the communications channel between a user and a server, and can even guarantee the identity of the server to the user.

Despite its advantages, encryption of this type has shown minimal adoption in person-to-person communications and person-to-group communications. Many of the solutions that do make use of private key infrastructure (PKI) do so only between individual users and servers, such that communications that traverse the internet are secure from eavesdropping, but the encryption is "broken" at the server. If such a server is compromised either via an unauthorized access, or via malfeasance by an authorized administrator, any communications that crosses or has crossed that server may be leaked to third parties. Further, services such as DropBox, which purport to protect user data through encryption, suffer the weakness that the service provider, rather than the user, owns and retains the encryption keys. In the case of a breach at the provider, the user's information is at risk of compromise and dissemination.

SUMMARY

A method for automatically disseminating a private key is presented. A first message requesting a key proxy instance is received from a first user device. The first message is signed and encrypted and comprises a first symmetric key. A key proxy server is directed to allocate a key proxy instance for communication with the first user device based on a first device public key that corresponds to the first user device. A unique URL corresponding to the key proxy instance is received from the key proxy server. A second message comprising the unique URL is sent to the first user device. The second message is encrypted using the first symmetric key and signed using a server private key. A third message comprising the URL of the key proxy instance is received from the first user device and forwarded to a second user device. The third message is encrypted using a second symmetric key generated by the first user device and signed using a first device private key that corresponds to the first user device.

As another example, a system for automatically disseminating a private key is presented. The system comprises a first user device, a second user device, and a server comprising one or more data processors having memory storing instructions. The memory storing instructions execute the steps of a method. In that method, a first message requesting a key proxy instance is received from a first user device. The first message comprises a first symmetric key. A key proxy server is directed to allocate a key proxy instance for communication with the first user device based on a first device public key that corresponds to the first user device. A unique URL corresponding to the key proxy instance is received from the key proxy server. A second message comprising the unique URL is sent to the first user device. The second message is encrypted using the first symmetric key and signed using a server private key. A third message comprising the URL of the key proxy instance is received from the first user device and forwarded to a second user device. The third message is encrypted using a second symmetric key generated by the first user device and signed using a first device private key that corresponds to the first user device.

As a further example, a method for facilitating communication between users is presented. A first encrypted signed message requesting a user public key of a receiving user is received from a first user device. The user public key is associated with a first cryptographic hash of a combined string. The combined string comprises a user ID and a service name. Whether the first cryptographic hash exists in storage is determined. A second encrypted signed message comprising the user public key associated with the first cryptographic hash is sent based on the determining. A message comprising (i) a symmetric key encrypted with the user public key; (ii) a second cryptographic hash of the user public key; and (iii) user-supplied content is received. A list of authorized devices for the receiving user is determined. The message is forwarded, without decrypting, to a second user device. The second user device is associated with the receiving user and appears in the list of authorized devices.

DETAILED DESCRIPTION

A lack of adoption for PKI-based data protection can be attributed to the fact that it can be cumbersome to use. In order to communicate with another person via PKI, a user generates his/her own public key and private key pair, storing the private key in a manner that ensures its safety and integrity. Then the user either shares his/her public key with another user or obtains the other user's public key. The public keys are managed in a data store that is commonly called a key ring. If the user wishes to use the same encryption key(s) on more than one device, the private key(s) are copied from a device where they already reside, onto one or more additional devices, in a way that ensures that the encryption key(s) cannot be captured in transit.

In order to facilitate adoption of PKI for person-to-person and person-to-group communications, the system and methods herein can, in some embodiments, accomplish one or more of at least four goals. First, they can provide for the creation and secure storage of a user's private key and the retrieval of public keys for any other people with whom the user communicates. Second, the systems and methods herein can provide for the secure transfer of the user's private key to other devices that the user wishes to use for such communications, without creating any point in the interaction where there is a "break" in the cryptography, such that a third party could intercept and copy the user's private key. Third, the systems and methods herein can allow a user to, from any enrolled device in the user's control, force the de-authorization of any other device that has been associated with the user's private key, such that if a device is stolen, lost, or otherwise rendered outside of the user's control, the device cannot be used to compromise the user's communications. Fourth, the systems and methods herein can provide an efficient workflow for the user while maintaining security.

Figure 1:
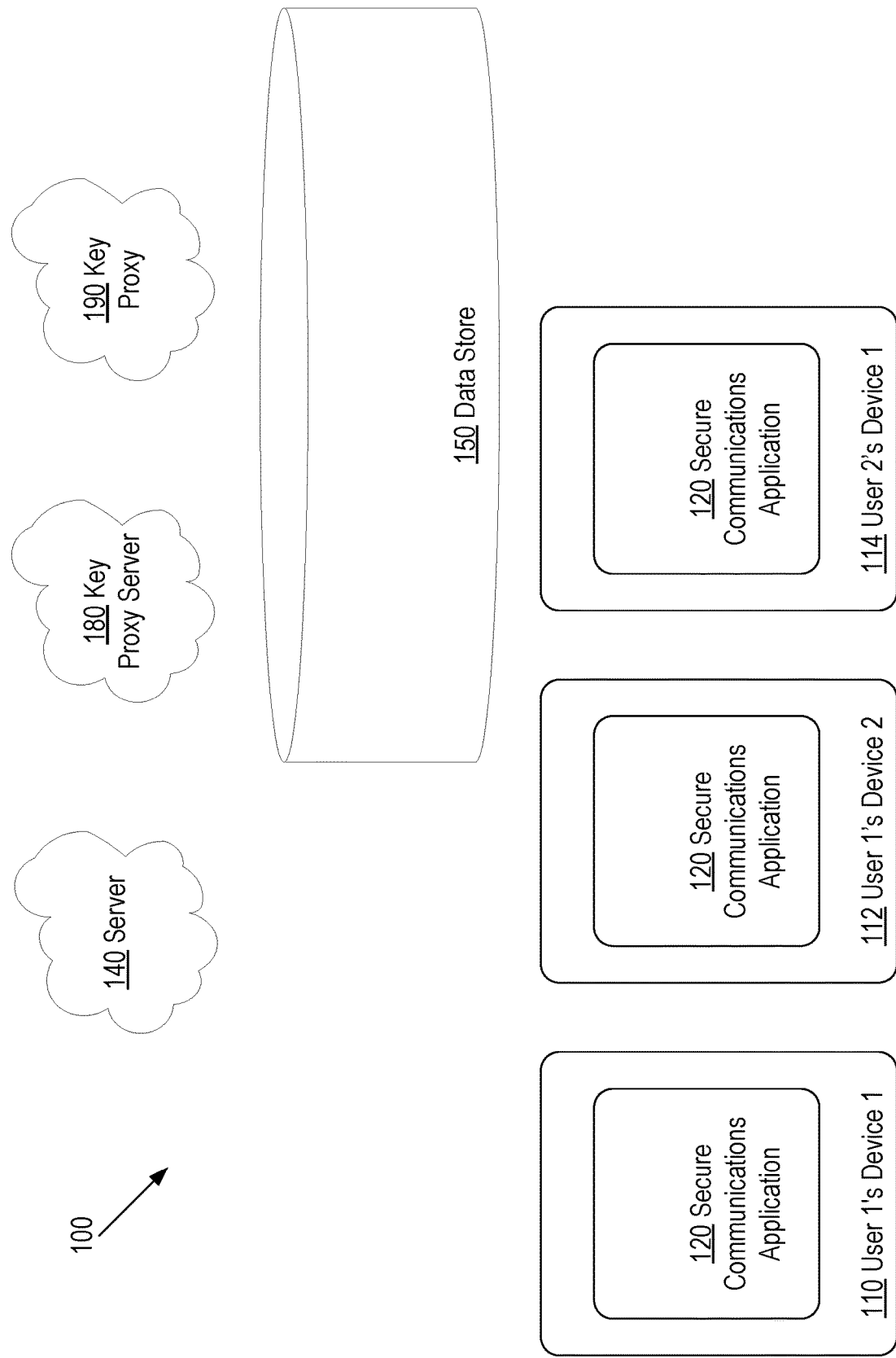
FIG. 1 depicts an exemplary secure communications system.

FIG. 1 depicts an exemplary secure communications system 100. The exemplary secure communications system 100 comprises a server 140, which may comprise one or more physical or virtual machines deployed either on premises or in cloud infrastructure. The exemplary communications system 100 additionally comprises a key proxy server 180, which may or may not reside on the same physical or virtual hardware as the server 140, and one or more key proxy instances 190. The one or more key proxy instances 190 may remain unconfigured until required, and may be destroyed immediately after use. Furthermore, when a key proxy instance is allocated for use, another key proxy instance may be automatically built so that the number of the one or more key proxy instances 190 remains constant.

One or more users, e.g., individuals who have registered for the secure communications service, may use the exemplary secure communications system 100. The one or more users may use one or more user devices 110, 112, and 114, e.g., computing devices associated with a user's secure communications service account. The one or more users may use the one or more user devices 110, 112, and 114, to communication with each other via the secure communications service. Each of the one or more user devices has an installed secure communications application 120 appropriate for its architecture (Linux, Windows, MacOS, Android, IOS). The one or more users may use one or more accounts, e.g., accounts with data-sharing services including e-mail providers such as Gmail or Outlook.com, content-storage services such as Dropbox or SharePoint, collaboration-messaging services such as Slack, instant message services, or other methods of person-to-person or group communications, as well as a secure communications service account.

Figure 2:
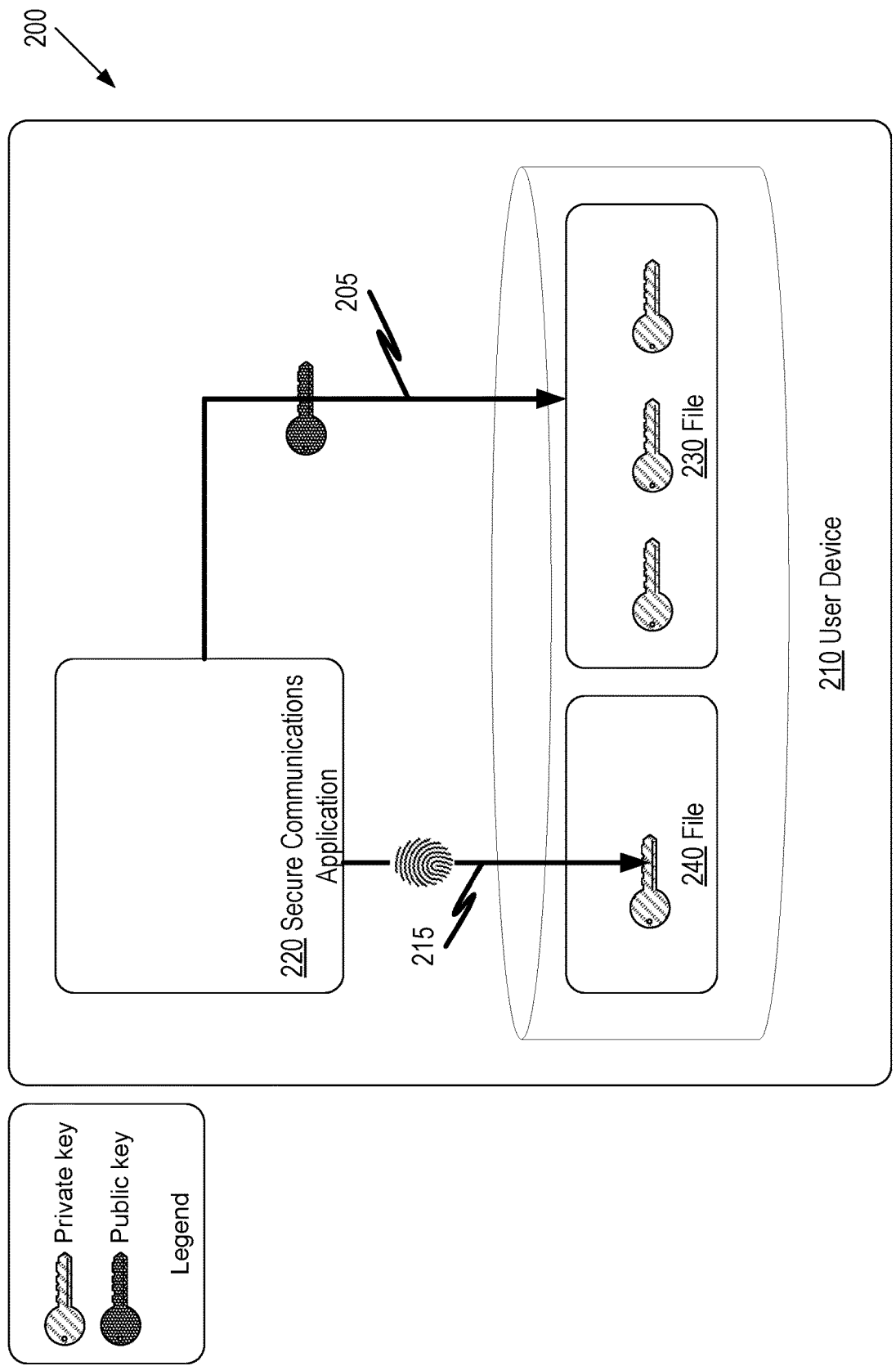
FIG. 2 depicts an exemplary authorized user device that stores user private keys.

FIG. 2 depicts an exemplary authorized user device 210 that stores user private keys. When a user device 210 is first initialized, it creates a file 230 for key storage. All initial user private keys are stored to the file 230. The file 230 is encrypted using a device public key. The device private key is stored in a file 240 that is protected by PIN, password, or biometric means. When the user opens a secure communications application 220 on the device, the user must prove his/her identity to the secure communications application 220 by providing the appropriate PIN, password, or biometric authentication. The secure communications application 220 uses the identity information, e.g., the PIN, the password, or the biometric authentication, to unlock the device private key. The secure communications application 220 uses the device private key to decrypt the file 230 containing the user private keys. When new user private keys are received, the user device 210 appends the new user private keys to the file 230 and re-encrypts the file 230 either with the current device public key, or with a newly-generated device public key. In this way, a user's historical keys are all available, so that the user may view messages and content that were encrypted using older keys, and all historical keys are protected using newly-generated device keys.

Figure 3:
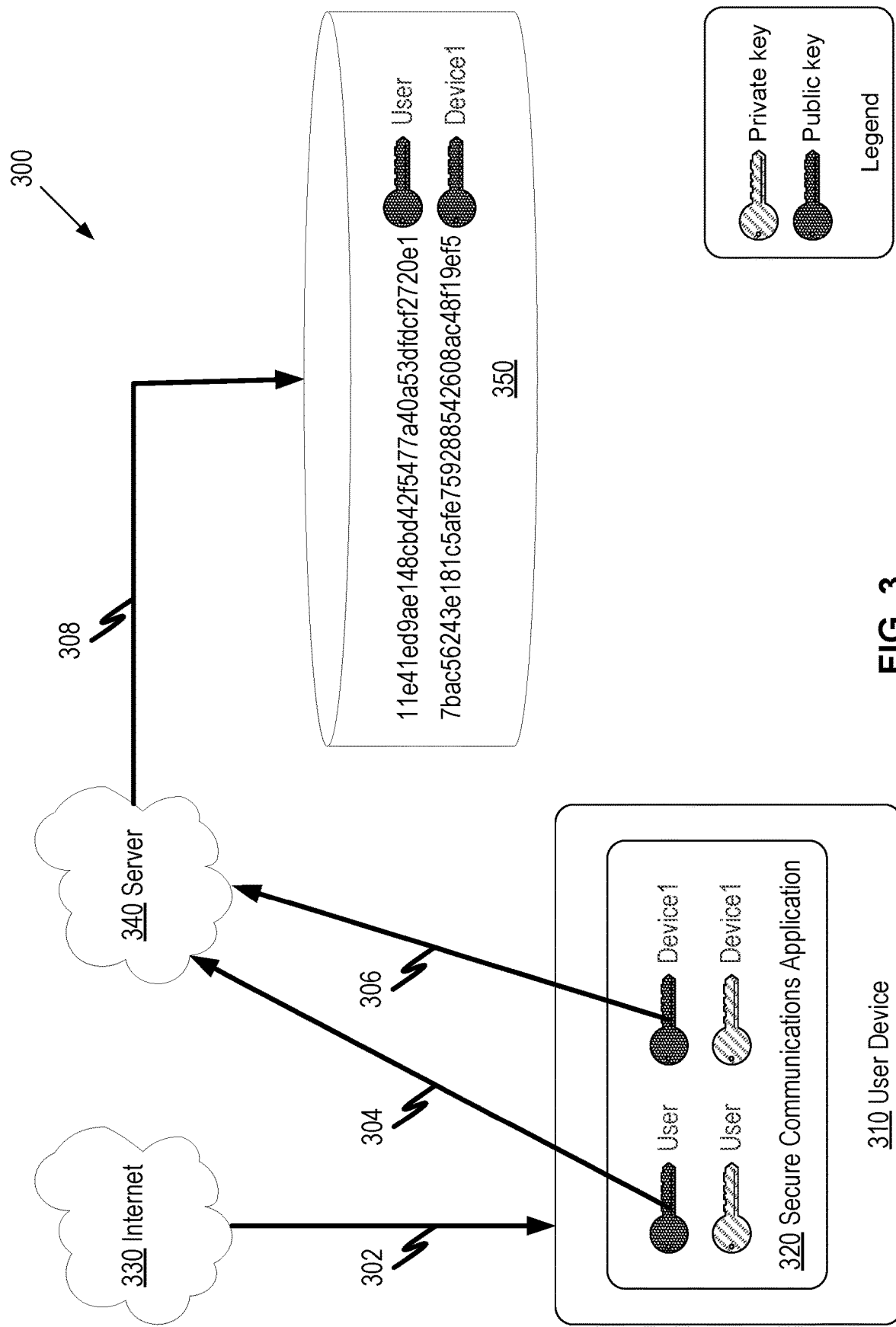
FIG. 3 is a diagram that depicts how a user of the system creates a new secure communications application account.

FIG. 3 is a diagram that depicts how a user of a secure communications system 300 creates a new secure communications application account. At 302, the user, through a user device 310 downloads a secure communications application 320 from the internet 330. After installing the secure communications application 320, the user runs the secure communications application 320 and chooses to create a new secure communications application account. The user selects a username and password, and may, optionally, select biometric authentication (e.g. fingerprint) in order to access his/her account on devices with that capability. A user account entry is then created on a server 340 using HTTPS to protect the contents of the interaction because the user is deemed to be a trusted agent for the new account.

The secure communications application 320 generates two unique asymmetric key pairs: one pair that is specific to the device—a device key pair—and one pair that is specific to the user-a user key pair. Each pair contains a public key and a private key. The secure communications application 320 sends a cryptographic hash of the user's account name and device ID, along with the two public keys, i.e., a user public key and a device public key, at 304 and 306, to a server 340 via HTTPS. The server 340 stores the user and device public keys in association with the cryptographic hashes in a data store 350. Once a user device, e.g., the user device 310, is authenticated with the user's secure communications application account, all communications with the server 340 are performed with cryptographic signatures so that the server 340 can be certain that a sending device is who it says it is.

Figure 4:
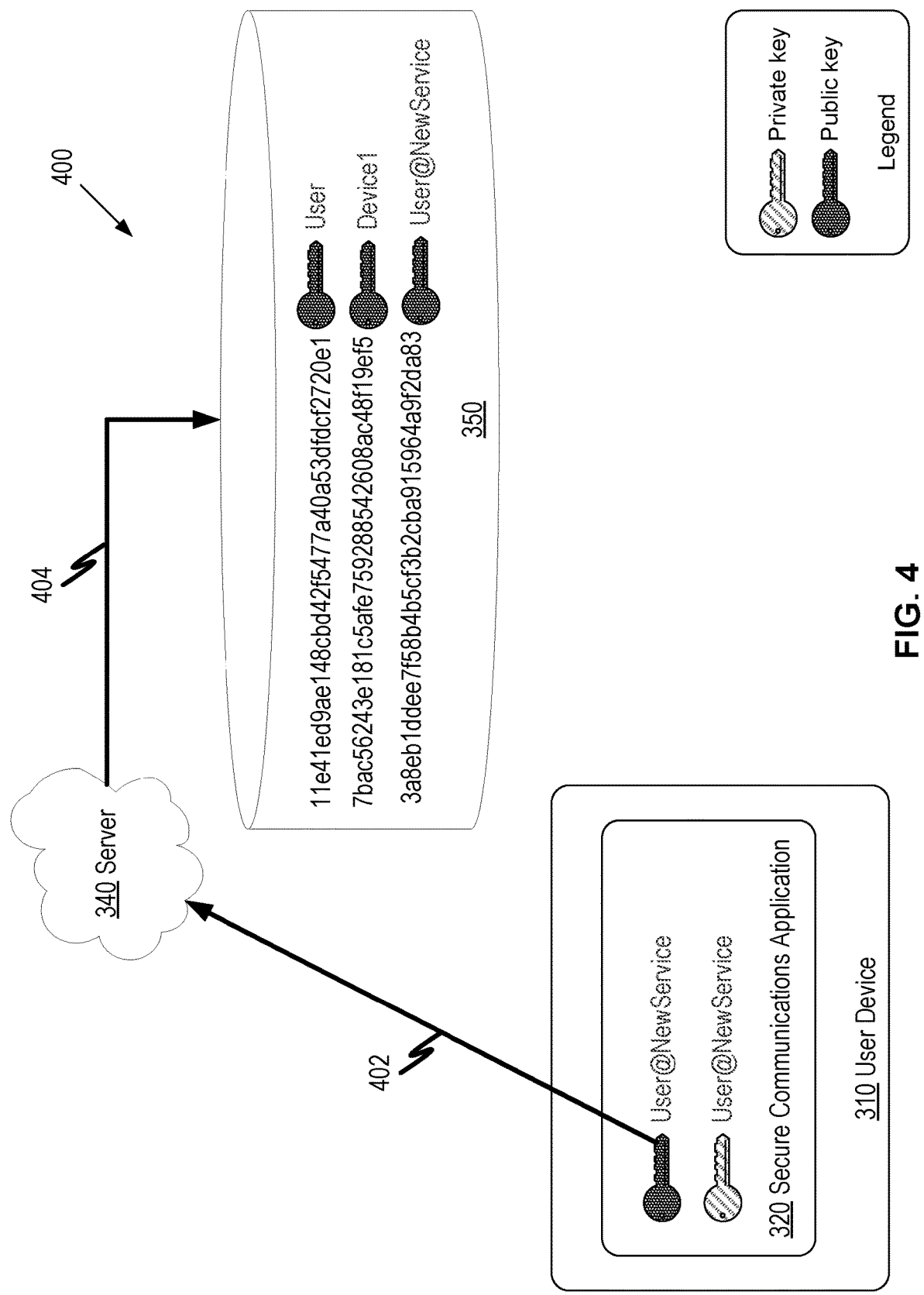
FIG. 4 is a diagram that depicts an association of a third-party account with an existing secure communications application account.

FIG. 4 is a diagram that depicts an association of a third-party account with an existing secure communications application account. A user runs the secure communications application 320 on the user device 310 and chooses to associate a third party account with the user's secure communications application account. The secure communications application 420 generates a new asymmetric key pair for the third party account. At 402, the secure communications application 320 sends a cryptographic hash of the user's third-party account name, along with the respective public key, to the server 340. At 404, the server 340 stores the public key for the new account in association with the cryptographic hash in the data store 350.

Figure 5:
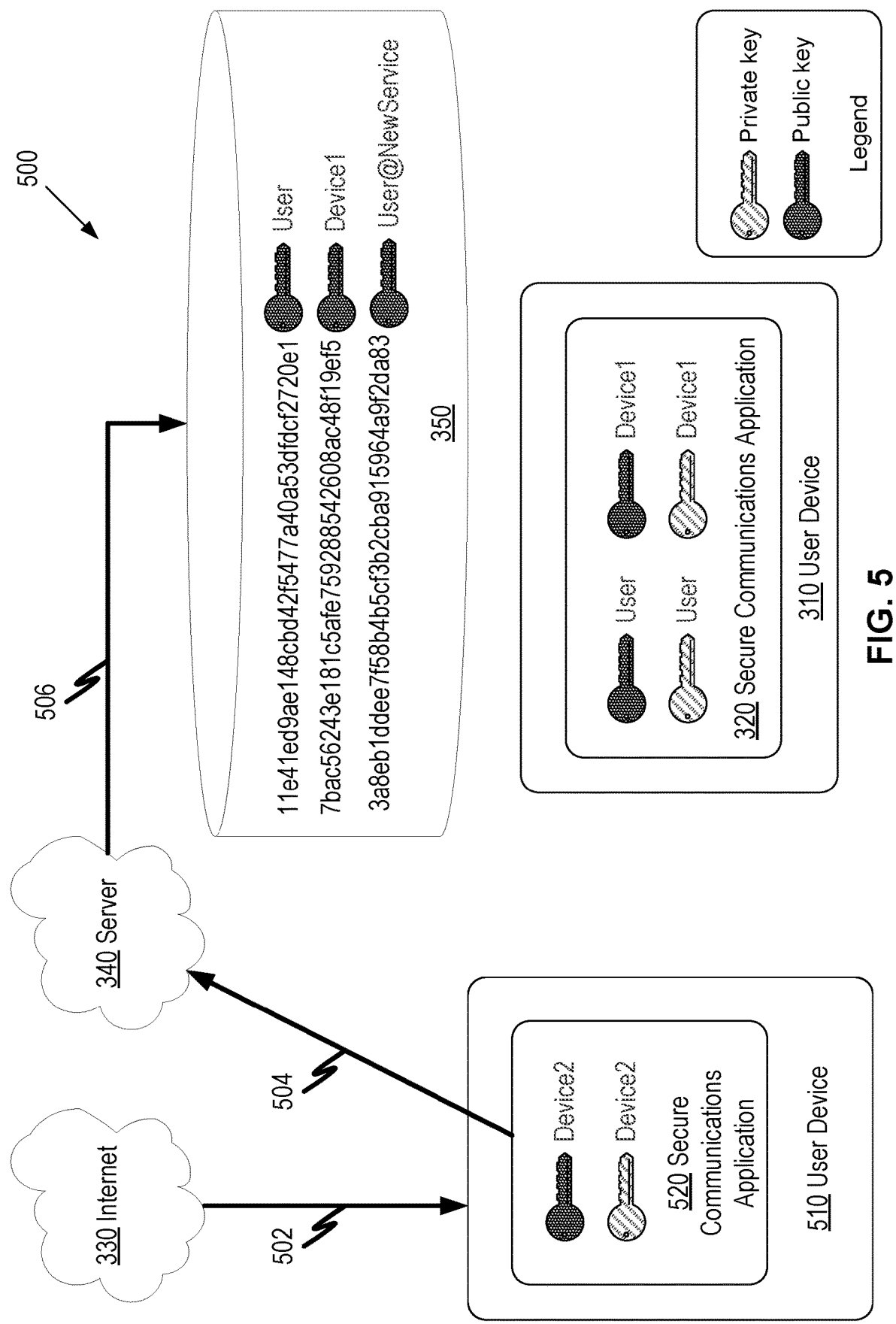
FIG. 5 is a diagram that depicts a first part of an association of a new user device with an existing user's secure communications application account.

FIG. 5 is a diagram that depicts a first part of an association of a new user device with an existing secure communications application account. At 502, a user downloads a secure communications application 520 from the internet 330 onto the new user device, e.g., a user device 510. After installing the secure communications application 520, the user runs the secure communications application 520 and chooses to connect using an existing secure communications application account. The secure communications application 520 generates an asymmetric key pair, which is specific to the user device 510. At 504, the secure communications application 520 requests the public key associated with the cryptographic hash of the secure communications application account from the server 340. At 506, the server 340 requests the cryptographic hash from the data store 350.

Figure 6:
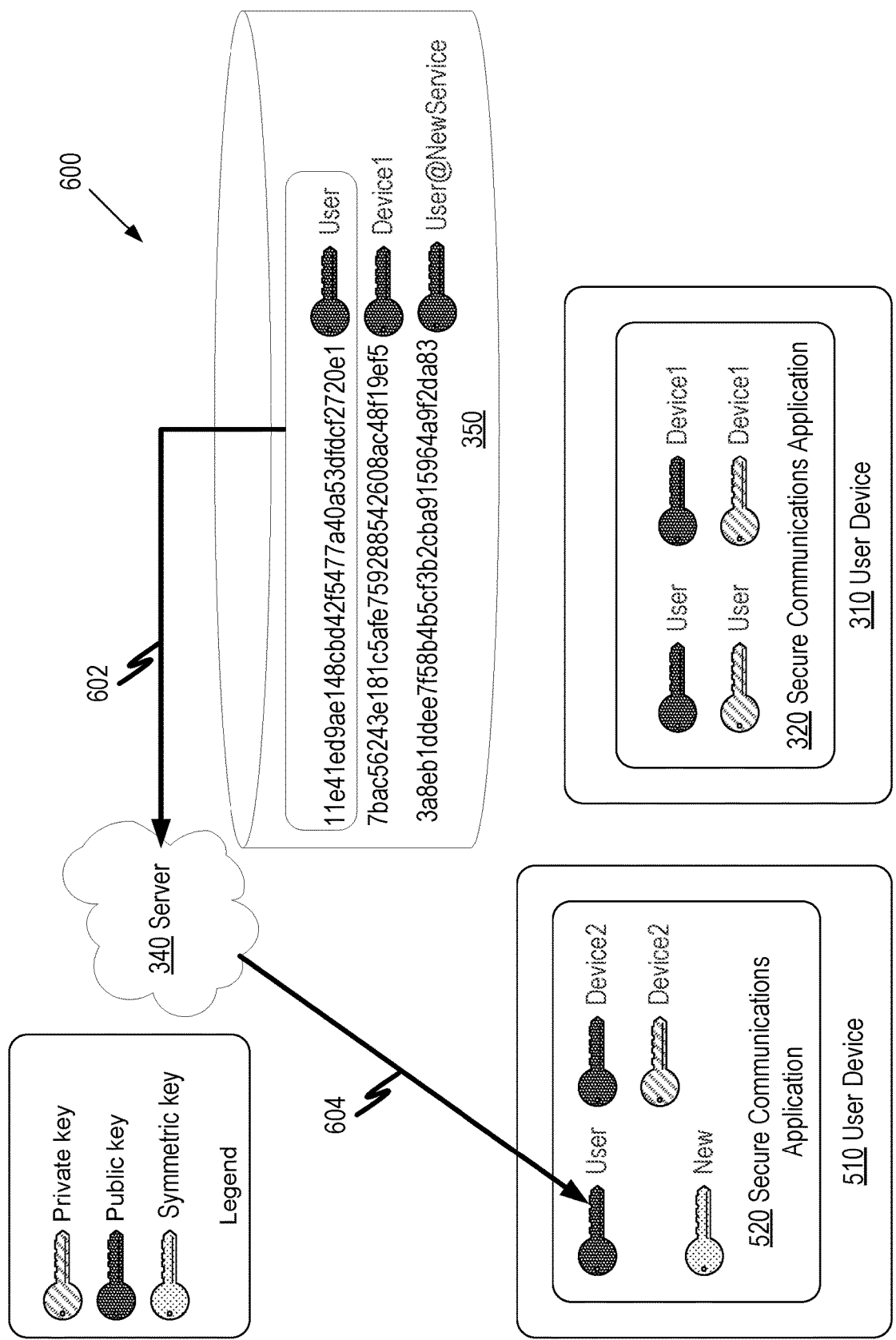
FIG. 6 is a diagram that depicts a second part of the association of the new user device with the existing secure communications application account.

FIG. 6 is a diagram that depicts a second part of the association of the new user device with the existing secure communications application account. At 602, the server 340 retrieves the appropriate public key from the data store 350. At 604, the server 340 sends the appropriate public key to the secure communications application 520, if it is available.

Figure 7:
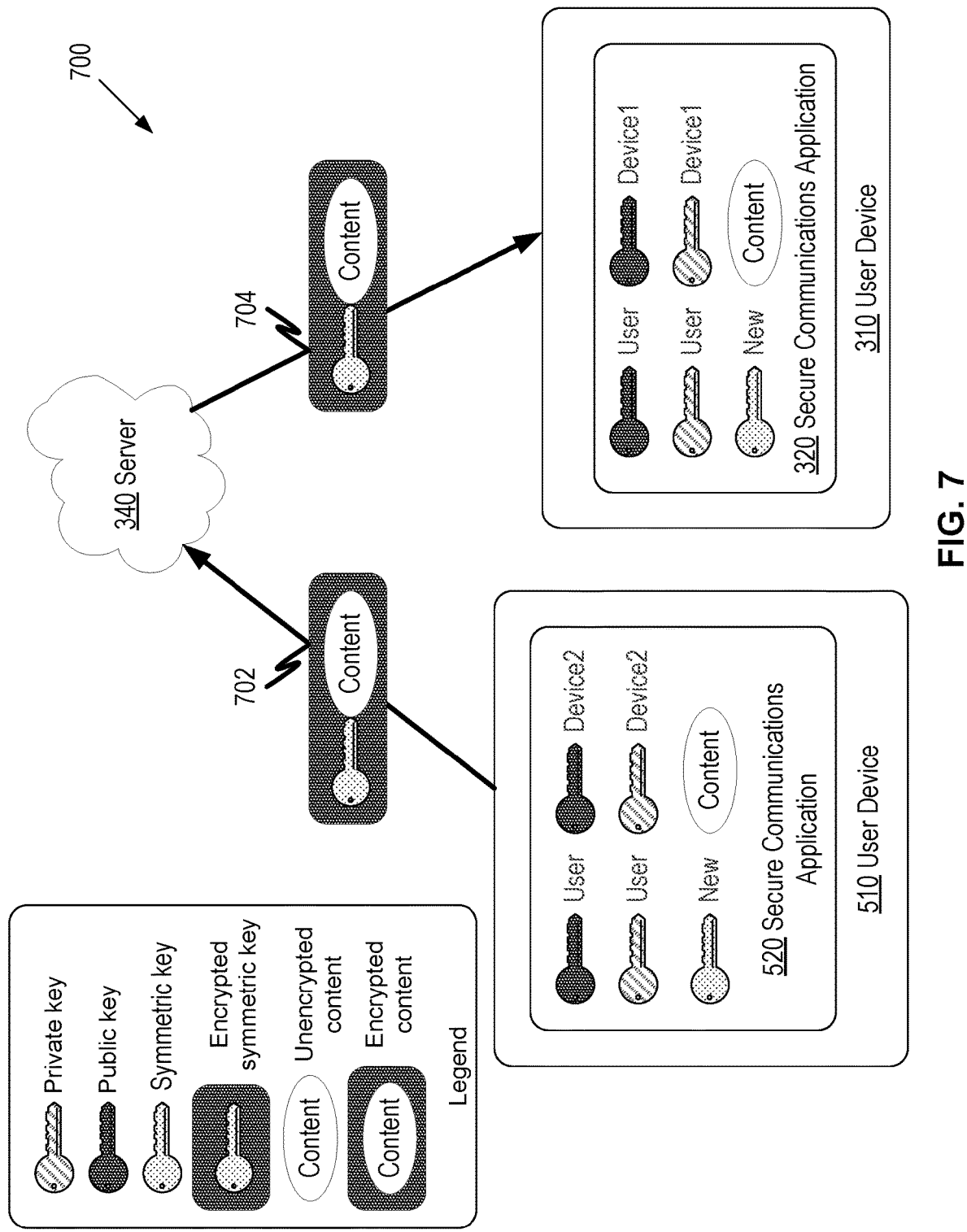
FIG. 7 is a diagram that depicts a third part of an association of a new user device with the existing secure communications application account.

FIG. 7 is a diagram that depicts a third part of the association of the new user device with the existing secure communications application account. The user device 510 creates and encrypts a message requesting the user's private keys and including a symmetric key. At 702, the user device 510 encrypts the message and sends it to the server 340, addressed to the user. At 704, the server 340 forwards the message to all of the user's authorized user devices, e.g., the user device 310. The user device 310 already has the user's private key, so it is able to decrypt the symmetric key and content of the request. The user device 310 presents a verification dialog to the user asking whether the user confirms that the user device 510 should be added to the existing secure communications application account. If the user confirms, the key transfer happens in accordance with the methods discussed with reference to FIGS. 11-15.

Figure 8:
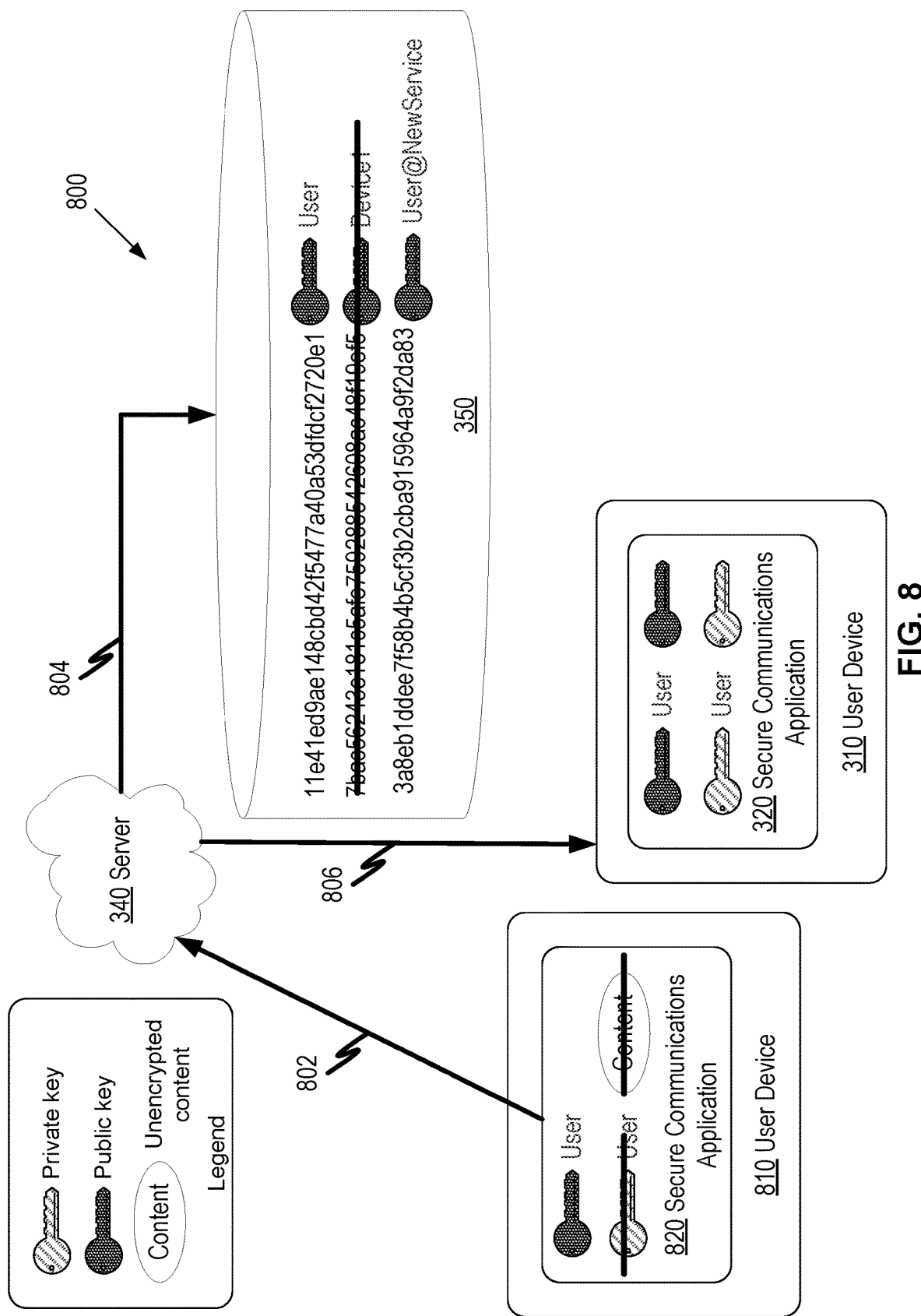
FIG. 8 is a diagram that depicts self-removal/de-authorization of a user device, e.g., a user device 810, from an existing secure communications application account.

FIG. 8 is a diagram that depicts self-removal/de-authorization of a user device, e.g., a user device 810, from an existing secure communications application account. The user runs a secure communications application 820 and chooses to remove and de-authorize the user device 810. At 802, the secure communications application 820 sends, to the server 340, a signed, encrypted message indicating that it should be removed from a user's list of authorized devices. The secure communications application 820 deletes all of the user's private keys and content stored on the user device 810. At 804, the server 340 removes the device requesting removal, i.e., the user device 810, from the user's list of authorized devices in the data store 350. At 806, the server 340 sends a message encrypted with the user's public key to remaining devices, e.g., the user device 310, indicating that the device requesting removal, i.e. user device 810, has been removed.

Figure 9:
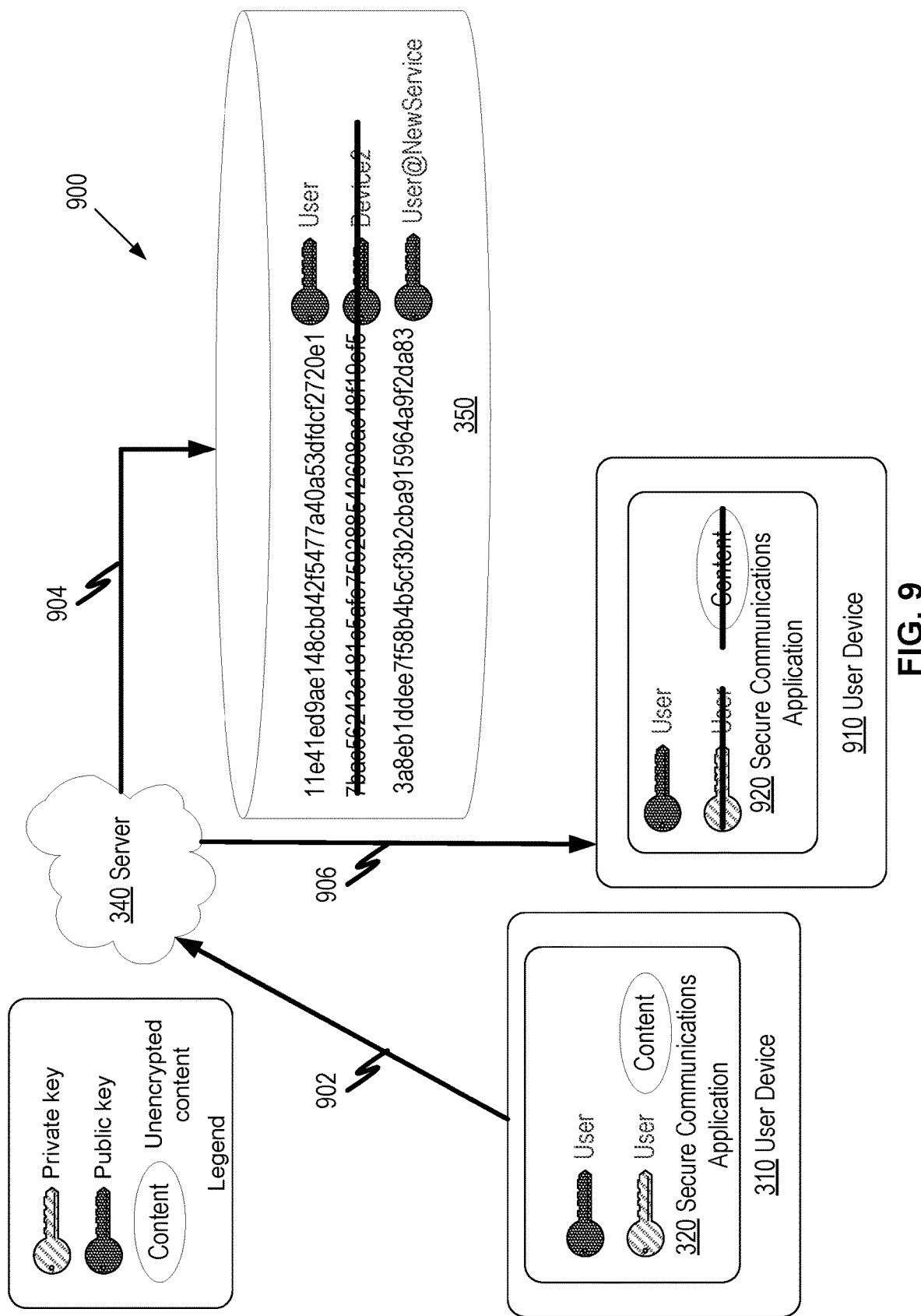
FIG. 9 is a diagram that depicts remote self-removal/de-authorization of a user device e.g., a user device 910, from an existing secure communications application account.

FIG. 9 is a diagram that depicts remote removal/de-authorization of a user device e.g., a user device 910, from an existing secure communications application account. The user runs a secure communications application 320 on the user device 310 and chooses to remove and de-authorize a different device, i.e., the user device 910 installed with a secure communications application 920. At 902, the secure communications application 320 sends, to the server 340, a signed, encrypted message indicating that the user device 910 should be removed from the user's list of authorized devices. At 904, the server 340 removes the user device 910 from the user's list of authorized devices in the data store 350. At 906, the server 340 sends a message encrypted with the user's public key to the user device 910, indicating that that it has been de-authorized, and must remove all private keys and content. If the user device 910 receives the message, the secure communications application 920 removes keys and content as directed.

Figure 10:
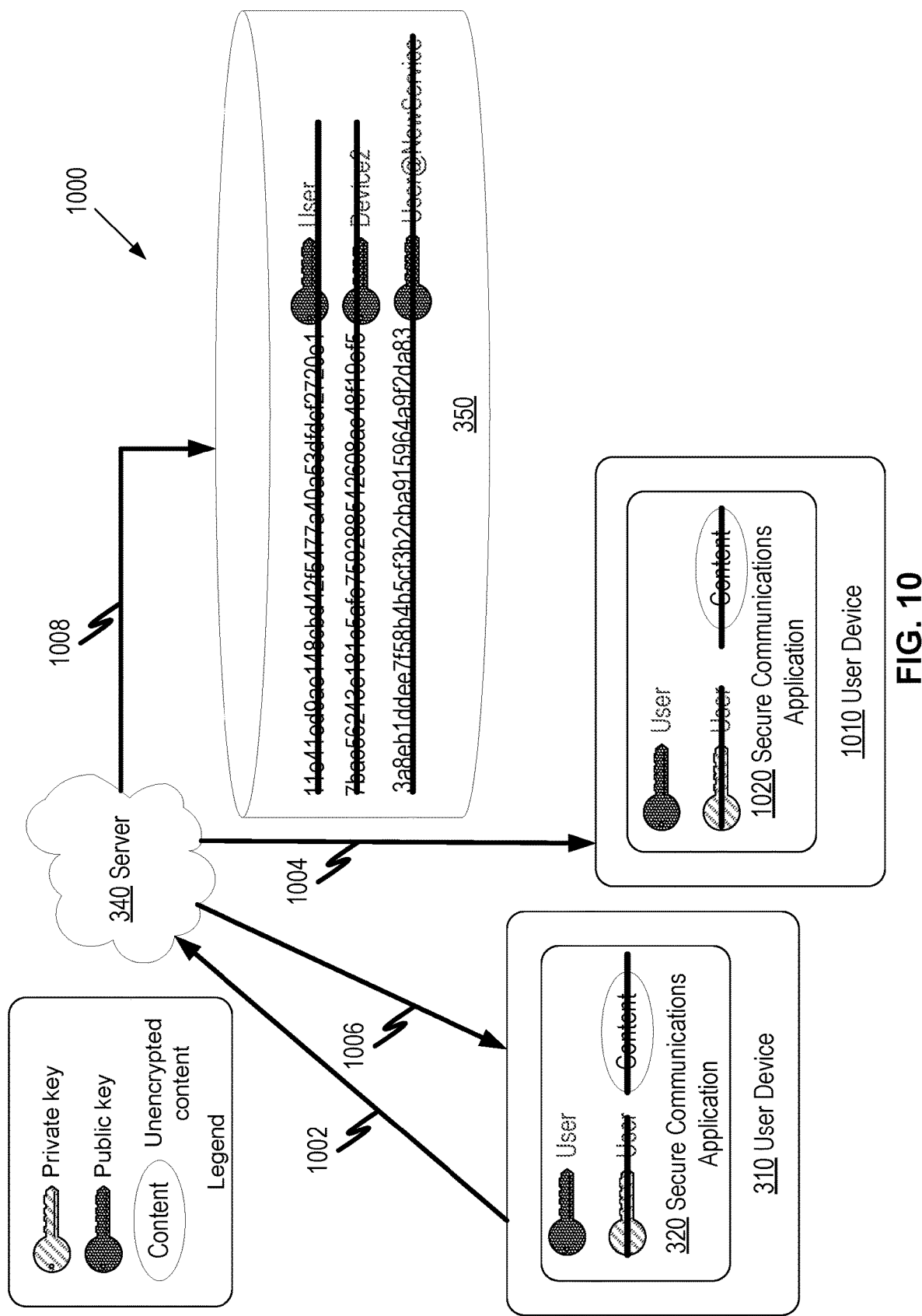
FIG. 10 is a diagram that depicts removal of all devices associated with a secure communications application account.

FIG. 10 is a diagram that depicts removal of all devices associated with a secure communications application account. The user runs the secure communications application 320 on the user device 310 and chooses to remove the secure communications application account. At 1002, the secure communications application 320 sends, to the server 340, a signed, encrypted message indicating that the secure communications application account is to be removed. At 1004 and 1006, the server 340 sends a message encrypted with the user's public key to all user devices, e.g., the user device 1010, including the requesting device, i.e., the user device 310, directing each user device to remove all user private keys and content stored on each of the user devices. Each of the user devices that receive the message remove the private keys and content stored on the user device. At 1008, the server 340 removes all of the user devices and the user's account from the data store 350.

Figure 11:
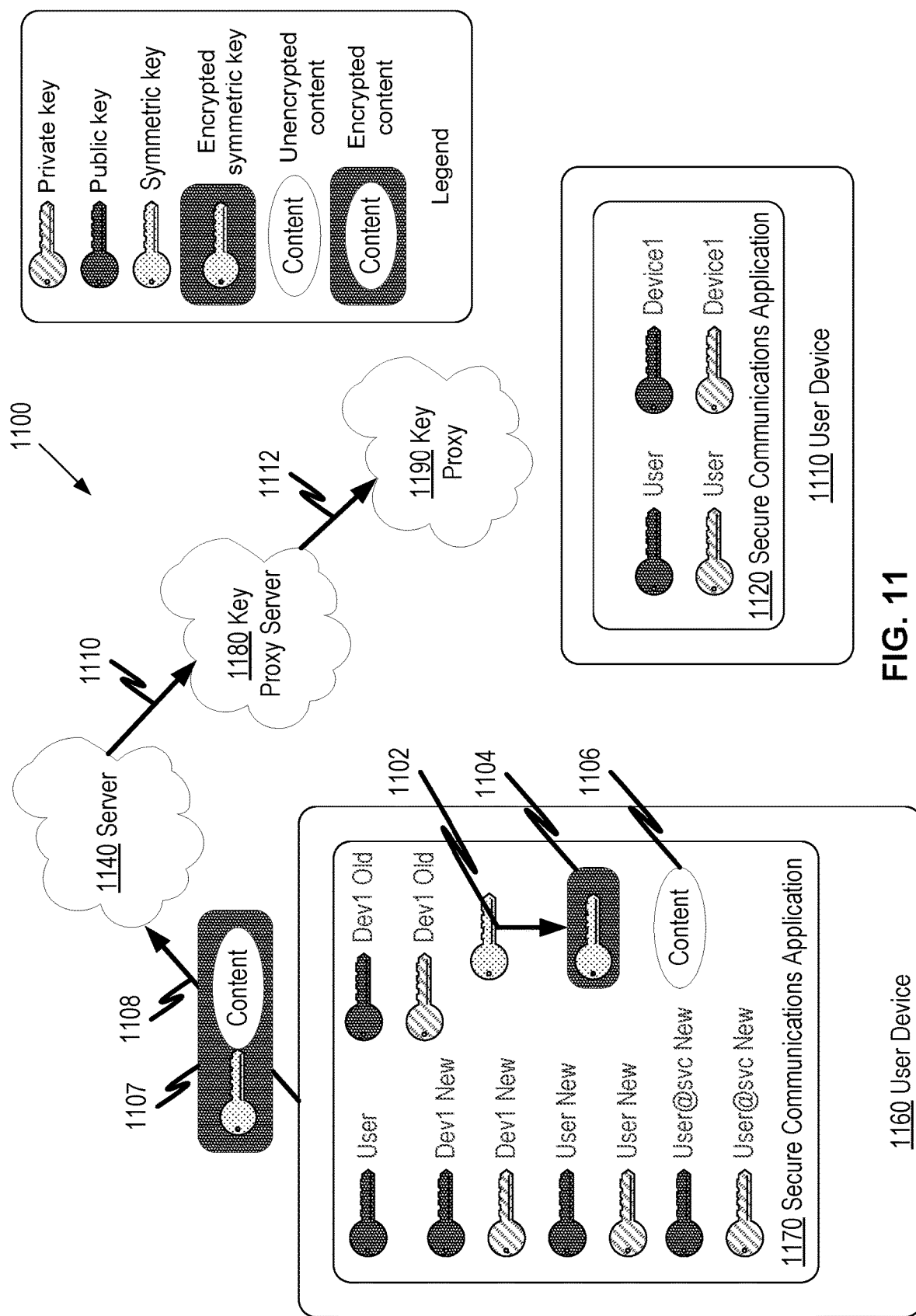
FIG. 11 is a diagram that depicts a first part of automatic private key dissemination to an authorized device.

FIG. 11 is a diagram that depicts a first part of an automatic private key dissemination to an authorized device. At 1102, the up-to-date device, i.e., user device 1160, generates a new symmetric key. At 1104, the user device 1160 encrypts the new symmetric key with the server's public key. At 1106, the user device 1160 creates a message requesting a key proxy instance and comprising the public device key for all devices that need to be brought up-to-date.

The user device 1160 encrypts the message using the symmetric key it just generated and signs the message using its own device private key. At 1108, the user device 1160 sends the message to a server, e.g., a server 1140.

The server 1140 checks the signature of the message, and if it correctly matches the public key it has on record for the device making the request, it decrypts the symmetric key using its own private key, and then uses the symmetric key to decrypt the message. At 1110, the server 1140 directs a key proxy server, i.e., a key proxy server 1180 to allocate a key proxy instance for use, and specifies the requesting device's public key as the only device authorized to upload information to that instance. At 1112, the key proxy server 1180 allocates a key proxy, e.g., a key proxy 1190, from the pool of available proxies.

Figure 12:
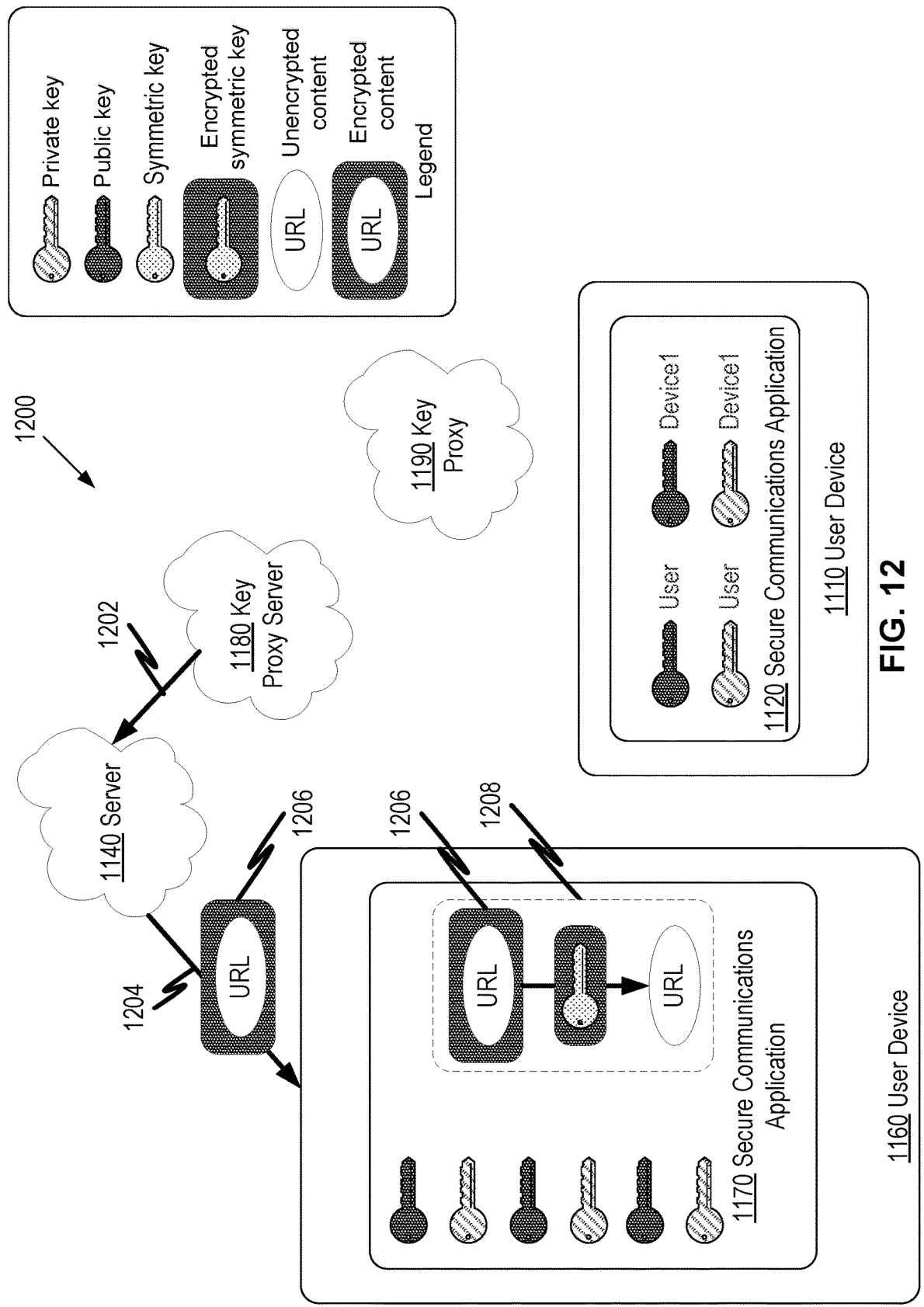
FIG. 12 is a diagram that depicts a second part of the automatic private key dissemination to authorized devices.

FIG. 12 is a diagram that depicts a second part of the automatic private key dissemination to authorized devices. At 1202, the key proxy server 1180 provides the server 1140 with a unique URL for the key proxy instance 1190. The server 1140 creates a response message comprising the unique URL, encrypts the message with the symmetric key sent by the requesting device, i.e., the user device 1160, and signs the message with its own private key. At 1204, the server 1140 sends the message to the requesting device, i.e., user device 1160. At 1206, the requesting device decrypts the unique URL.

Figure 13:
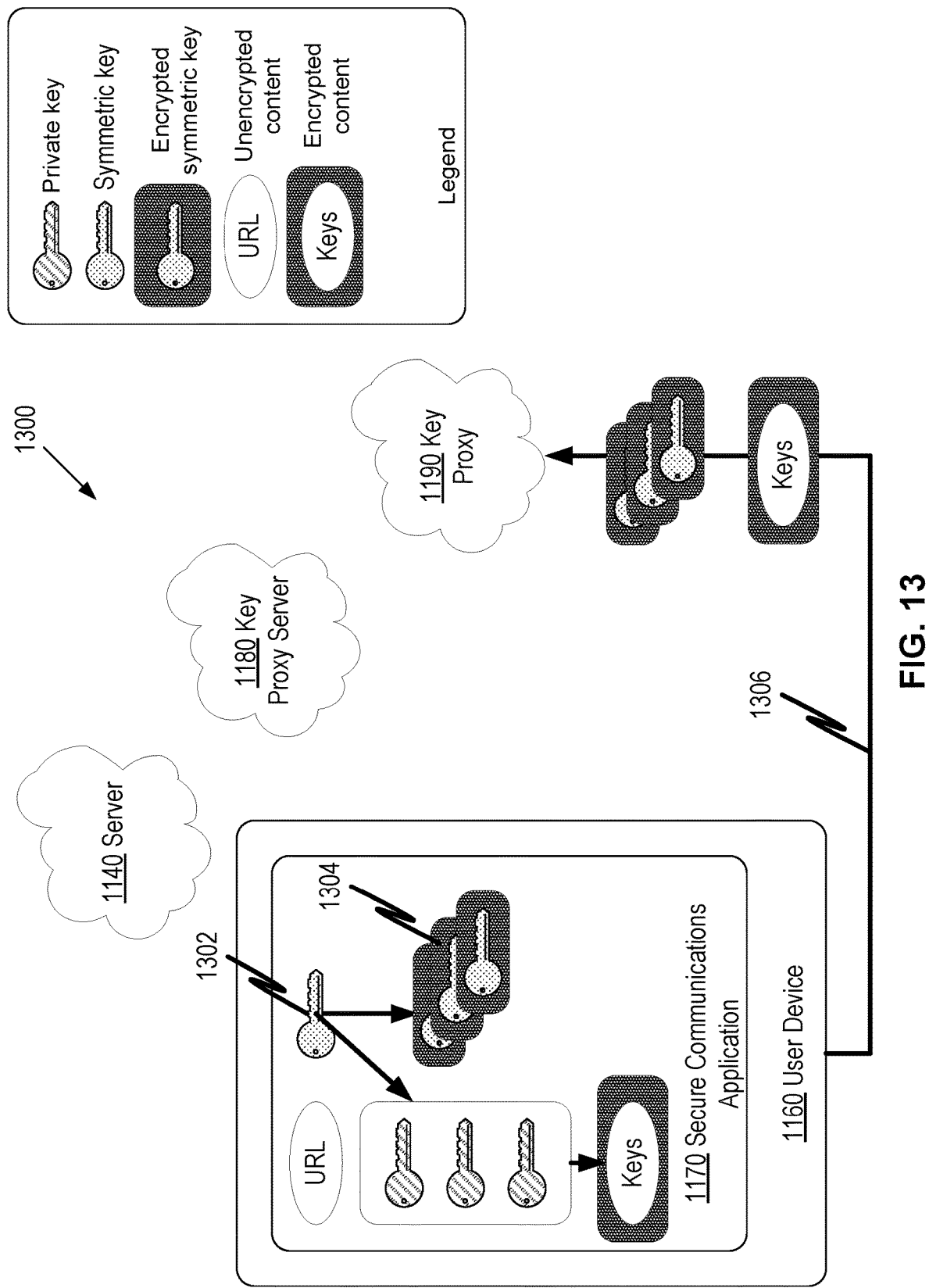
FIG. 13 is a diagram that depicts a third part of the automatic private key dissemination to authorized devices.

FIG. 13 is a diagram that depicts a third part of the automatic private key dissemination to authorized devices. At 1302, the user device 1160 generates another symmetric key, and encrypts all of its user private keys with the symmetric key. At 1304, the user device 1160 then encrypts the symmetric key with each of the device public keys of any devices that need to be updated with the user's private keys. The user device 1160 generates a message comprising one or more encrypted symmetric keys (one for each device to which it is disseminating keys) and a private key bundle that has been encrypted with the symmetric key. The user device 1160 signs the message with its own device private key. At 1306, the user device 1160 establishes an HTTPS connection to the key proxy instance 1190, using the unique URL that was provided by the server 1140, and sends the signed message. The key proxy instance 1190 receives the message and checks the signature to ensure that it matches the public key it was given by the key proxy server 1180. If there is a match, the key proxy instance 1190 accepts the message and prepares to send the encrypted bundle to authorized requesters.

Figure 14:
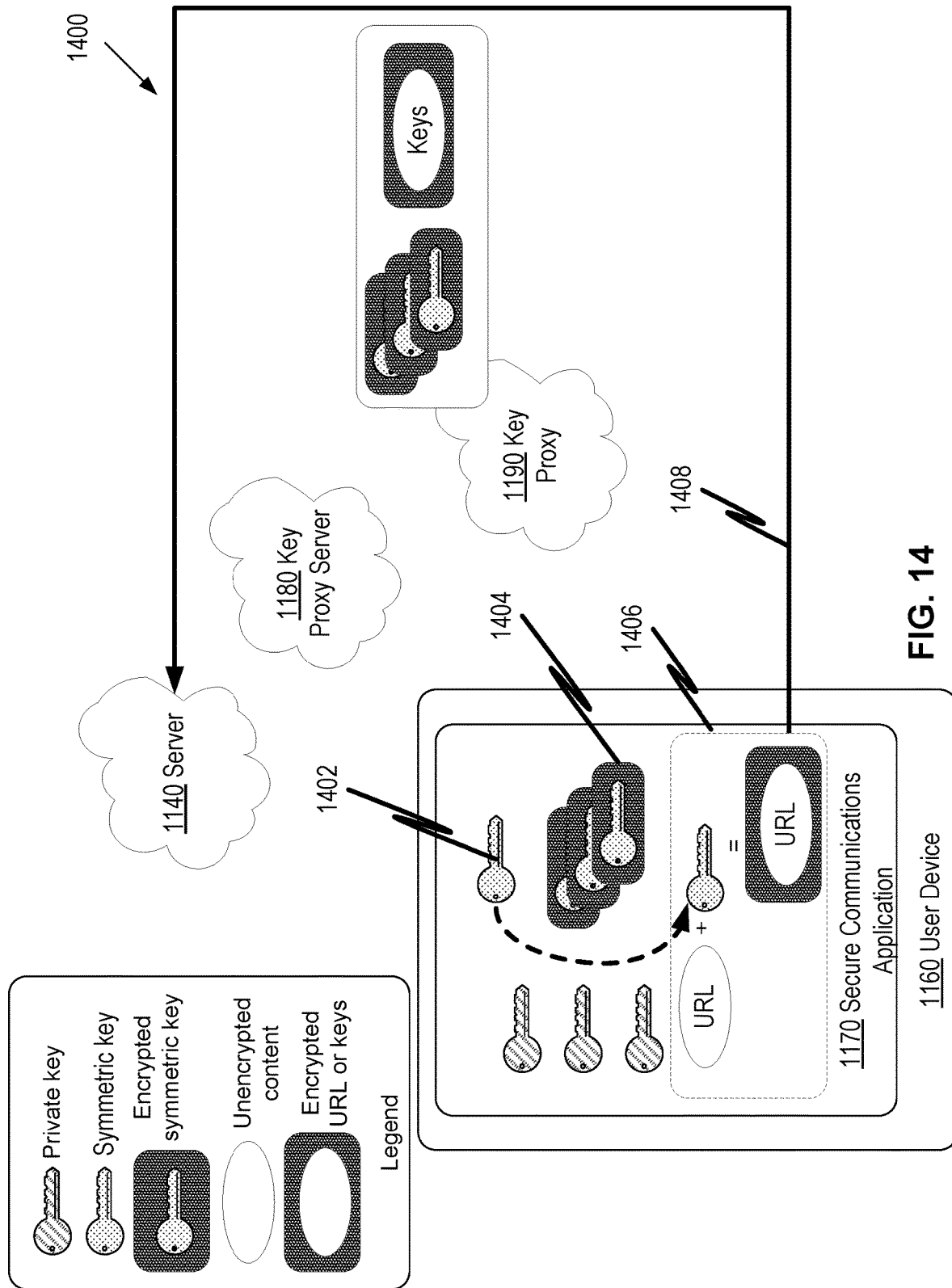
FIG. 14 is a diagram that depicts a fourth part of the automatic private key dissemination to authorized devices.

FIG. 14 is a diagram that depicts a fourth part of the automatic private key dissemination to authorized devices. At 1402, the user device 1160 generates another symmetric key. At 1404, the user device 1160 encrypts the symmetric key with each of the device public keys of any devices that need to be updated with the user's private keys. At 1406, the user device 1160 creates a message containing the unique URL of the key proxy instance 1190 and encrypts that message using the symmetric key. At 1408, the user device 1160 signs the message using its own device private key, and sends it to the server 1140, addressed to all authorized devices for the user.

Figure 15:
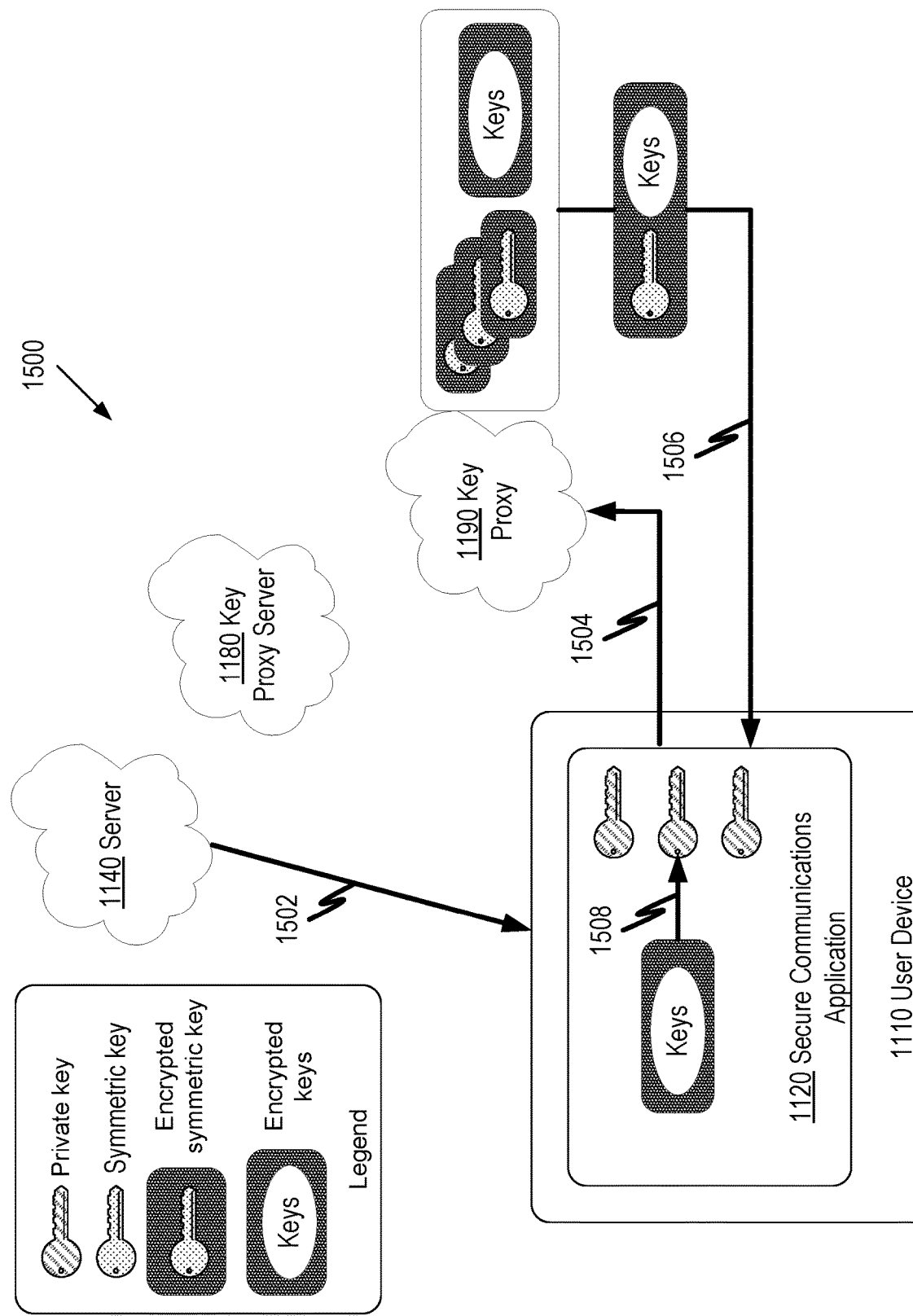
FIG. 15 is a diagram that depicts a fifth part of the automatic private key dissemination to authorized devices.

FIG. 15 is a diagram that depicts a fifth part of the automatic private key dissemination to authorized devices. At 1502, the server 1140 cannot decrypt the message, but forwards it to all of other devices associated with the user's secure communications application account. Each user device, e.g., user device 1110, checks the signature to ensure that it came from the user device it claims to have come from. If the signature is valid, each user device decrypts the symmetric key contained in the message using its own device private key, then decrypts the unique URL of the key proxy instance 1190 using the symmetric key. Each user device then generates a request for key download, signing the request with its own private key. At 1504, each user device connects to the key proxy instance 1190 at the specified URL and sends the signed request. At 1506, if the signature matches one of the device public keys that was provided to the key proxy instance 1190, the key proxy instance 1190 sends the encrypted key bundle to each user device. Each user device then uses its own private key to decrypt the symmetric key in the bundle, then uses that symmetric key to decrypt the set of user private keys the bundle comprises.

Figure 16:
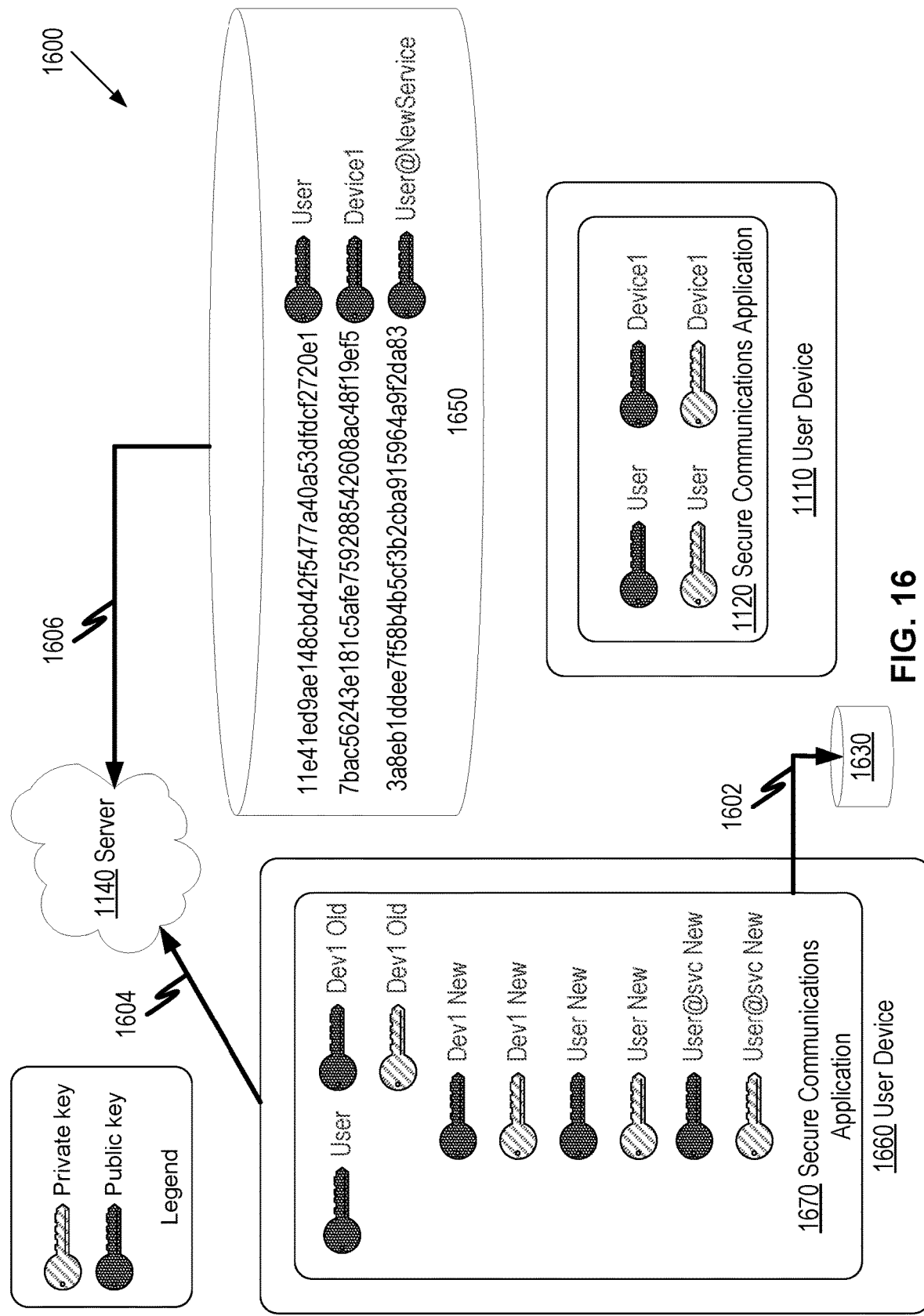
FIG. 16 is a diagram that depicts re-initialization of keys associated with a secure communications application account and third party accounts.

FIG. 16 is a diagram that depicts re-initialization of keys associated with a secure communications application account and third party accounts. An initiating device, i.e., the user device 1660, creates a new device key pair for itself. The initiating device creates a new user key pair for every account (both secure communications application account and third-party accounts) that the user has registered with the secure communications application 1670. At 1602, the user device 1660 stores its new keys locally in local storage 1630, in accordance with the method described with reference to FIG. 2. At 1604, the user device 1660 sends, to the server 1140, an encrypted signed message indicating that a key dissemination needs to occur. Key dissemination follows the method described with reference to FIGS. 11-15.

Figure 17:
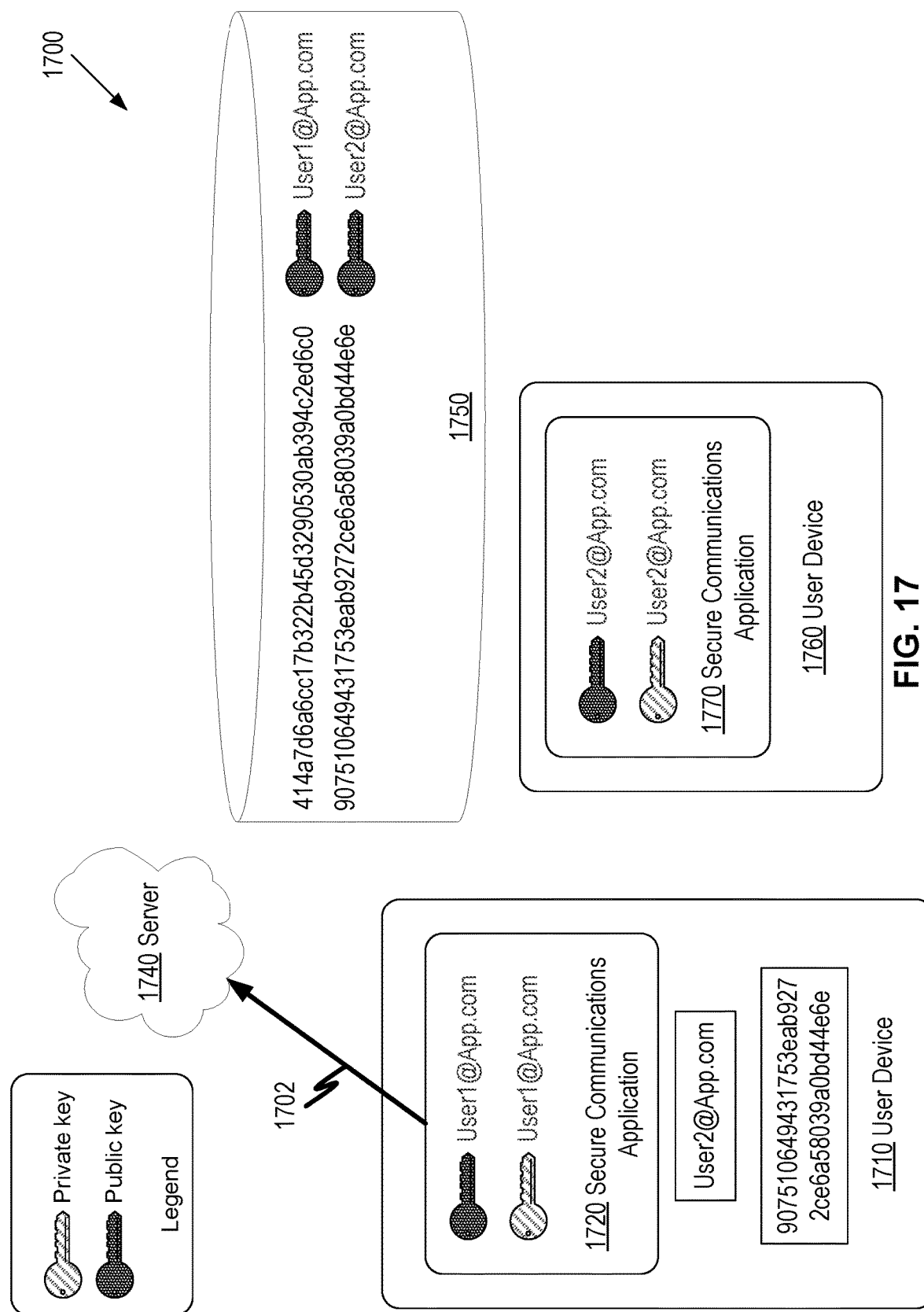
FIG. 17 is a diagram that depicts a first part of sending data from a user to another user.

FIG. 17 is a diagram that depicts a first part of sending data from a first user to a second user. The first user, using the secure communications application 1720 on one of his/her authorized devices, e.g., user device 1710, indicates that the first user wants to send information to a second user (e.g. user device 1760, by clicking on the second user's name in their friend list, or by other means appropriate). The secure communications application 1720 takes the second user's user ID, combines it with the a service name or a medium name into a string, and creates a cryptographic hash of the combined string. At 1702, the secure communications application 1720 creates an encrypted, signed message requesting the user public key associated with that hash, and sends the message to the server 1140.

Figure 18:
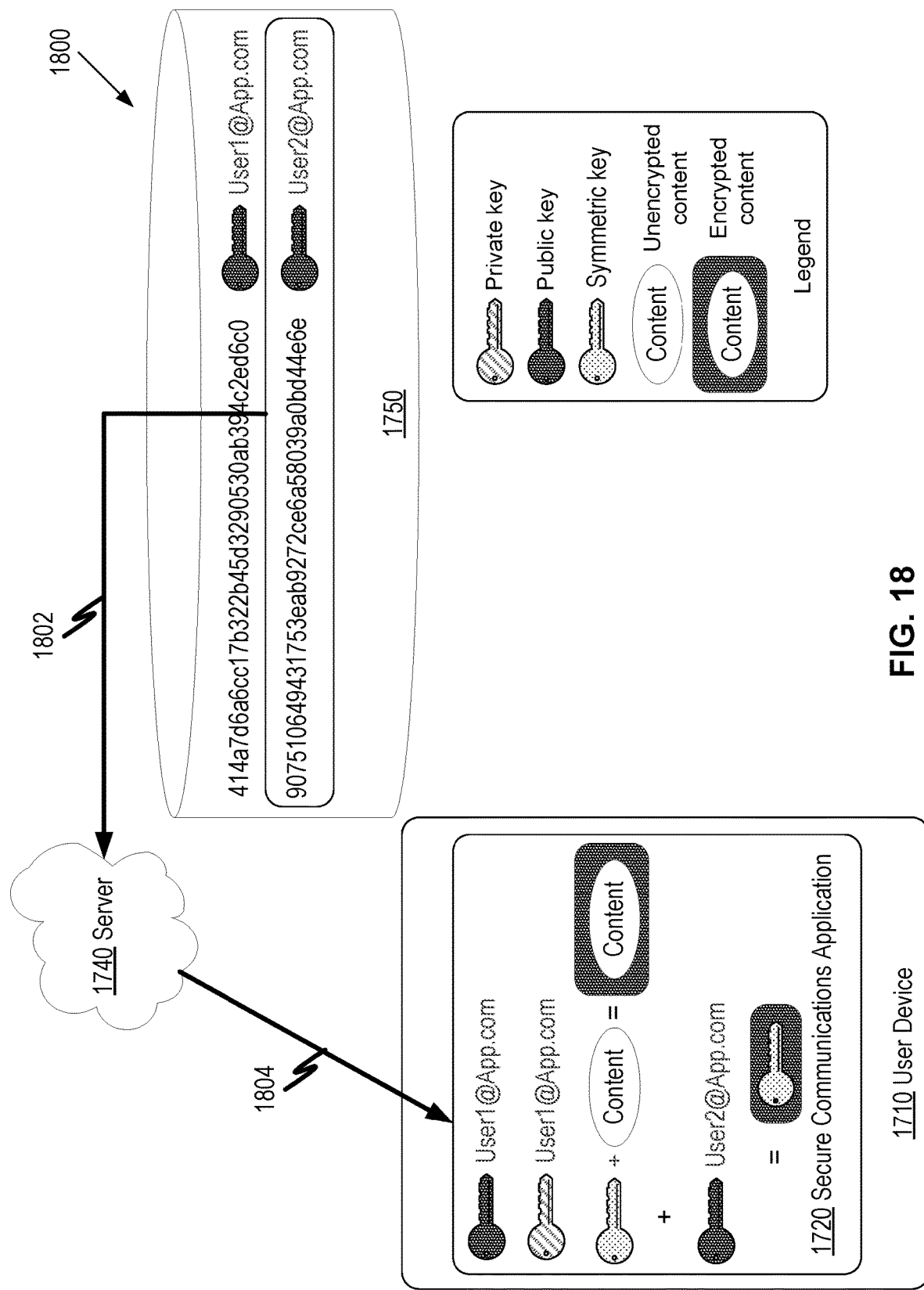
FIG. 18 is a diagram that depicts a second part of sending data from a user to another user.

FIG. 18 is a diagram that depicts a second part of sending data from the first user to the second user. At 1802, the server 1740 retrieves the hash from a data store 1750. If there is a key associated with that hash in the data store 1750, the server 1740 creates an encrypted, signed message containing the key. At 1804, the server 1740 sends the encrypted, signed message back to the secure communications application 1720 running on the user device 1710. The secure communications application 1720 receives the key, and uses it, in conjunction with a newly-generated symmetric key, as well as the information the user wishes to communicate (e.g., a text message, a file, or other content) to create a bundle which contains: (1) the symmetric key, encrypted with the user public key of the desired recipient; (2) a cryptographic hash of the public key that was used to encrypt the symmetric key; (3) the actual user-supplied content to be sent.

Figure 19:
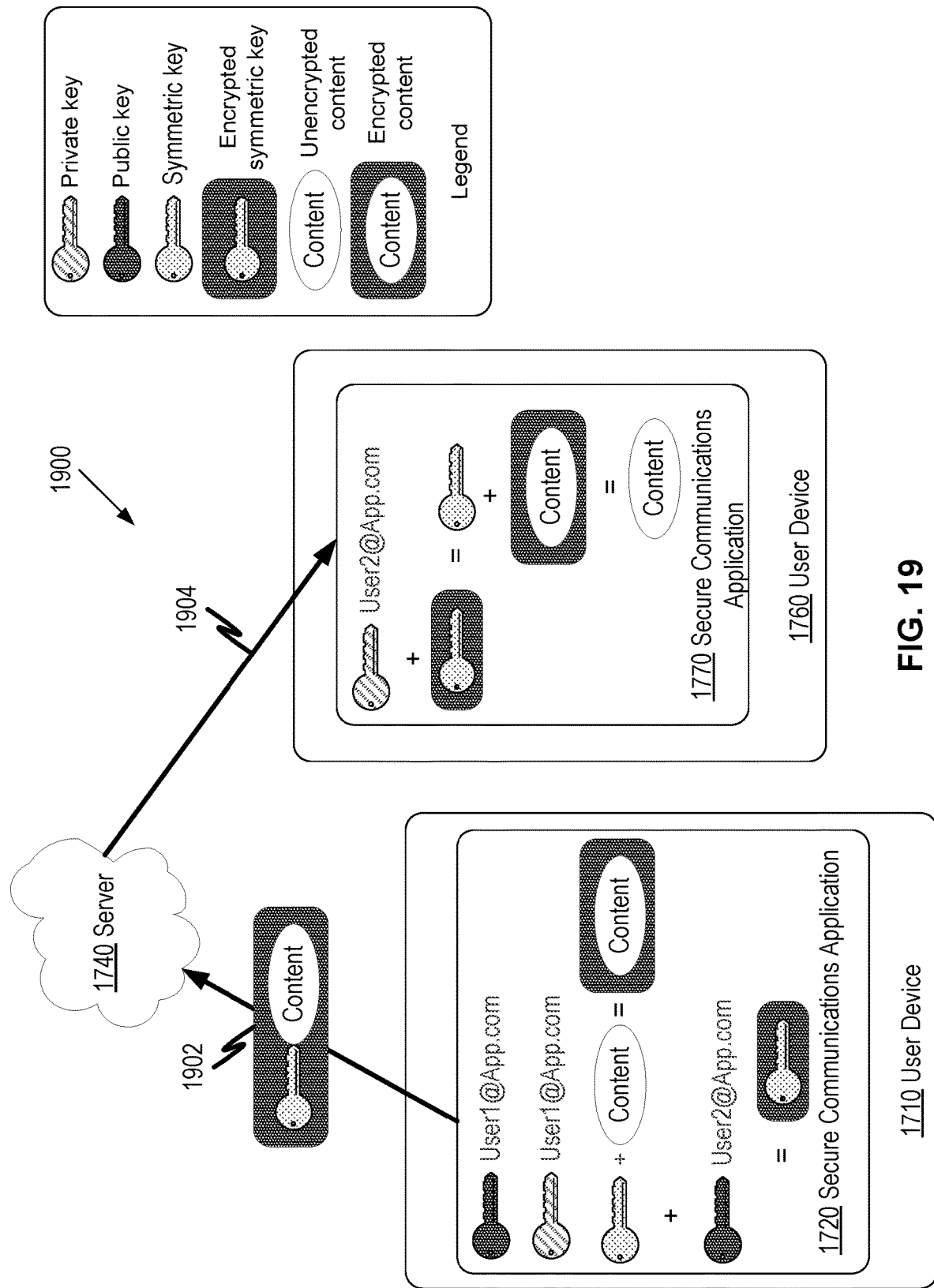
FIG. 19 is a diagram that depicts a third part of sending data from a user to another user.

FIG. 19 is a diagram that depicts a third part of sending data from the first user to the second user. The secure communications application 1720 signs the bundle with the user private key appropriate to the medium being used, and sends the bundle in a message to the server 1740 at 1902, addressed to the appropriate user. The server 1740 cannot decrypt the message, but forwards the message at 1904 to every device on the second user's list of authorized devices, e.g., user device 1760. Any or all of those devices, when they receive the message, check the signature of the message to ensure that it came from who it says it did, and (if it did) extract the cryptographic hash it contains, and use that to look up in their local key store which user private key to use to decrypt the symmetric key. The secure communications application 1770 then decrypts the symmetric key, and uses that, in turn, to decrypt the message contents and present them to the second user in whatever way is appropriate for the medium.

Figure 20:
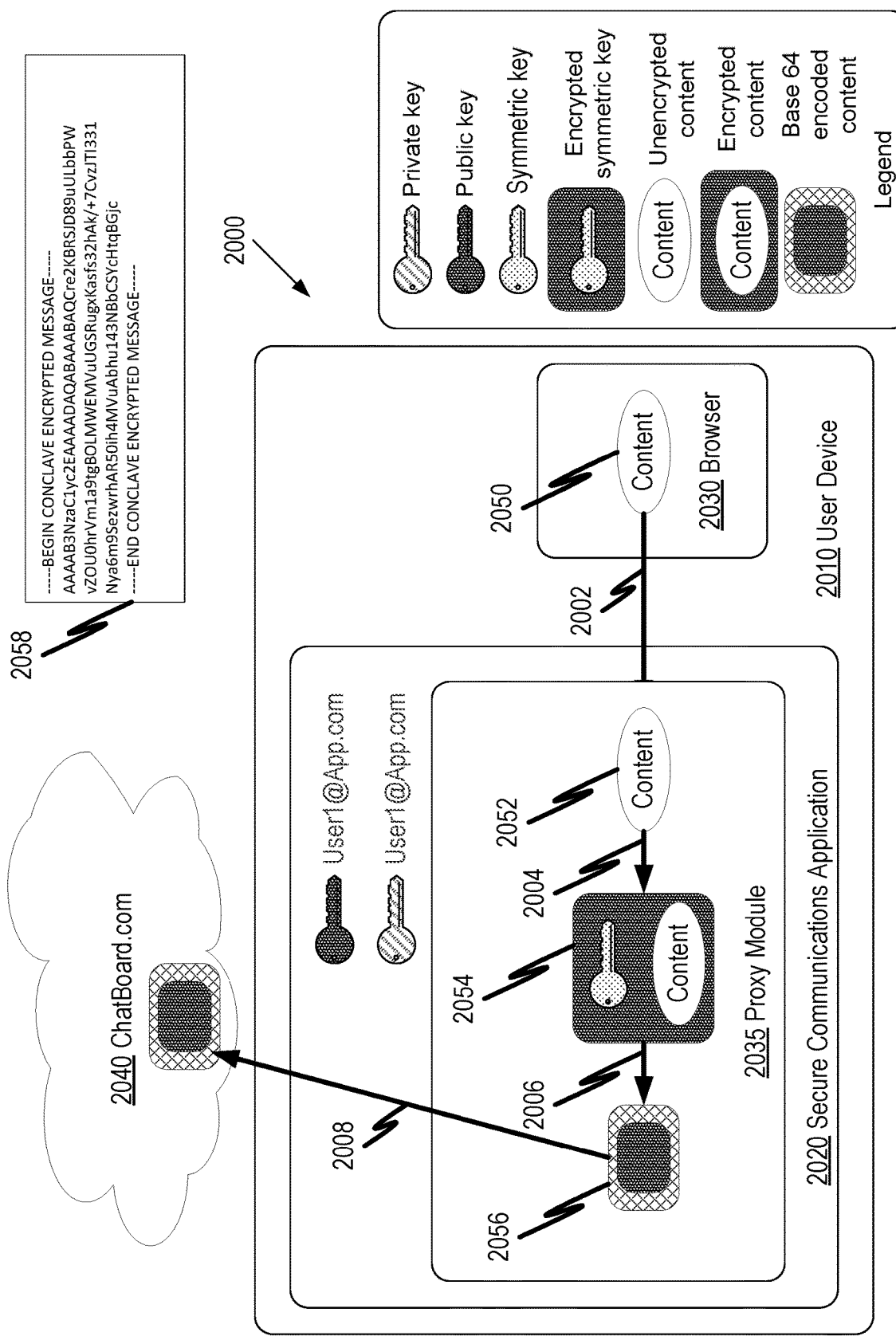
FIG. 20 is a diagram that depicts interacting with other users via a third-party website by posting content.

FIG. 20 is a diagram that depicts interacting with other users via a third-party website by posting content. A browser 2030 on a user device 2010 is configured to use the secure communications application 2020 as its web proxy. When the user wishes to share secure communications application-protected content on the third party website, e.g., chatboard.com 2040, all the user must do is post that information. A request to post content 2050 is intercepted at 2002 by the secure communications application 2020, which will determine if it is appropriate to encrypt content. If the content 2052 is to be encrypted, the secure communications application 2020 determines which secure communications application-registered site users are intended recipients of the content 2052. At 2004, the secure communications application 2020 constructs a message 2054 in a manner similar to the methods described with reference to FIGS. 17-19. The message contains the content 2052 encrypted with a new symmetric key, and a copy or copies of that symmetric key each encrypted with the public keys of all intended recipients, including that of the sending user. At 2006, the message will be converted to an alphanumeric text block 2056 via encoding such as Base64, and then will be wrapped in a fence of distinctive characters, e.g., fenced data block 2058. The secure communications application 2020 replaces the content of the user's submission to the website with this fenced data block and submits the request to the third-party website at 2008 on the user's behalf.

Figure 21:
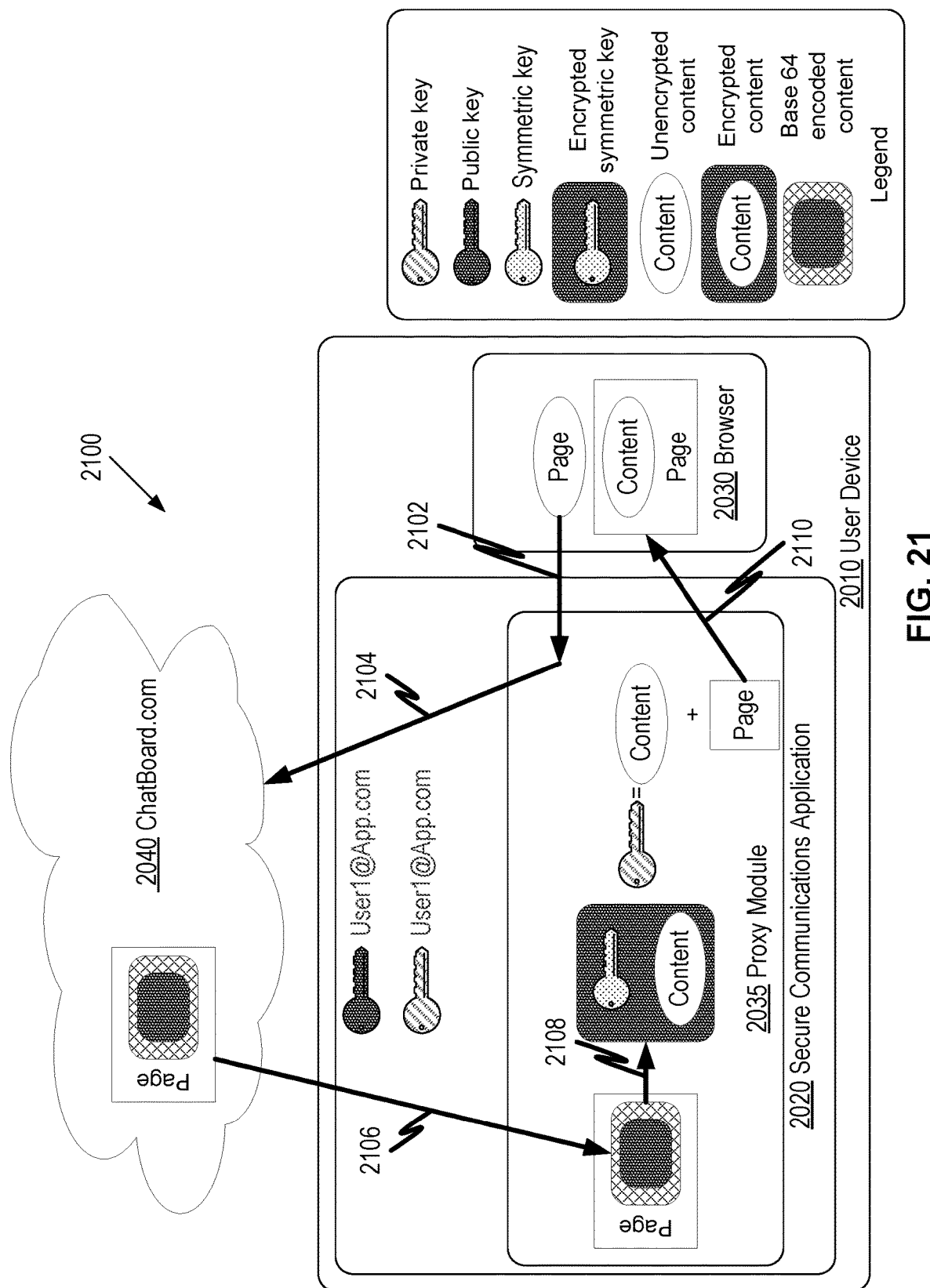
FIG. 21 is a diagram that depicts interacting with other users via a third-party website by reading content on the website.

FIG. 21 is a diagram that depicts interacting with other users via a third-party website by reading content on the website. At 2102, the browser 2030 sends a request to the secure communications application 2020 for the page in question. The secure communications application 2020 sends the request to the web server on behalf of the user at 2104. At 2106, results are returned from the web server, and the secure communications application 2020 inspects the contents to determine if any properly-formatted text is present in the content. If the contents contain properly-formatted text, at 2108, the secure communications application 2020 decodes the Base64 encoding of the block, locates the hash values for any keys present in the message, and compares the hashes with the locally-stored list of hash values. If the secure communications application 2020 finds a hash match, it uses the corresponding locally-stored user private key to decrypt the symmetric key from the message, decrypts the content of the message using the symmetric key, then replaces the entire message block, including the fences, with the contents of the decrypted message, before passing the response back to the browser 2030 at 2110.

Figure 22:
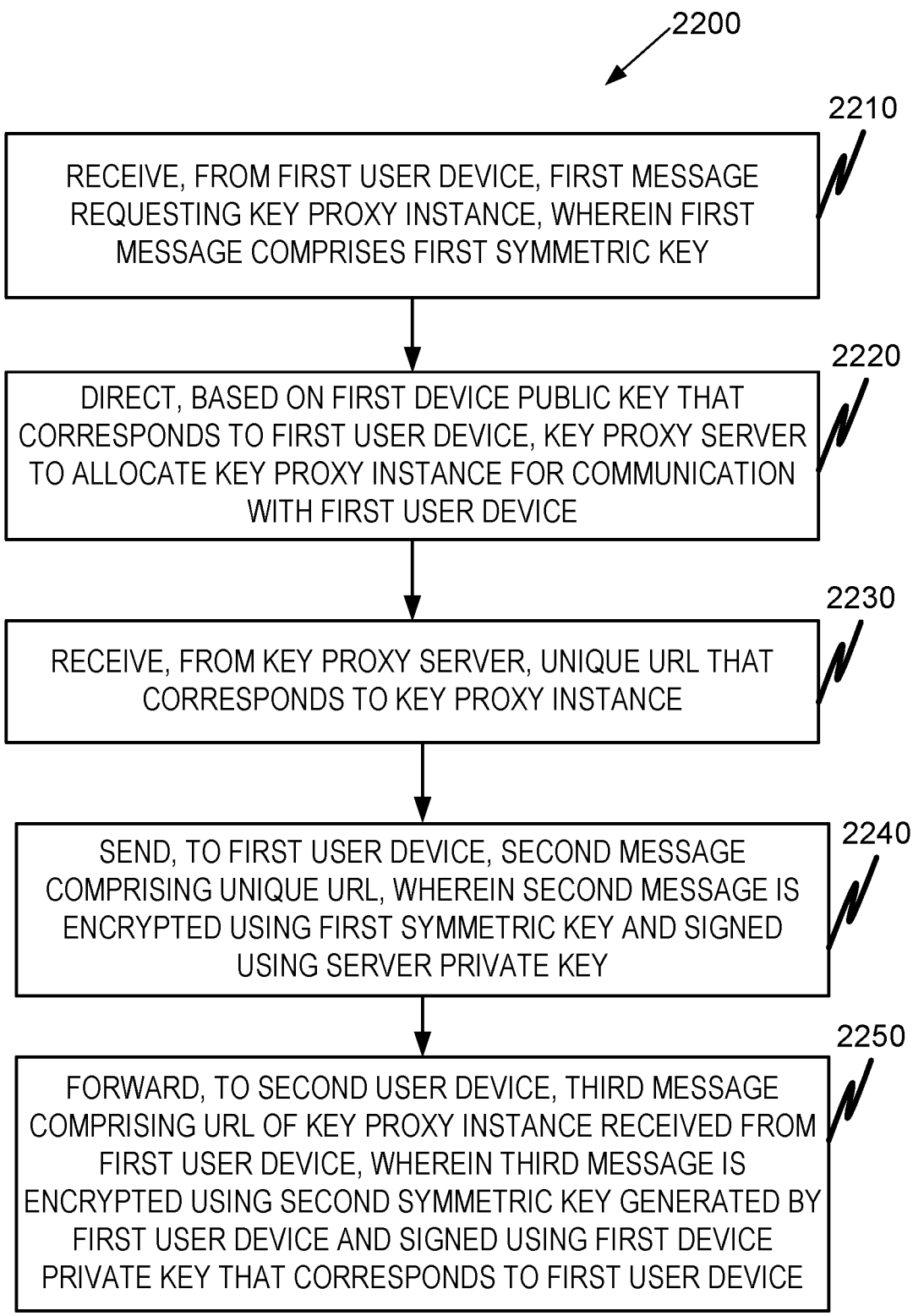
FIG. 22 is a flow diagram 2200 depicting a method for automatically disseminating a private key.

FIG. 22 is a flow diagram 2200 depicting a method for automatically disseminating a private key. At 2210, a first message requesting a key proxy instance is received from a first user device. The first message comprises a first symmetric key. At 2220, a key proxy server is directed to allocate a key proxy instance for communication with the first user device based on a first device public key that corresponds to the first user device. A unique URL corresponding to the key proxy instance is received from the key proxy server at 2230. A second message comprising the unique URL is sent to the first user device at 2240. The second message is encrypted using the first symmetric key and signed using a server private key. At 2250, a third message comprising the URL of the key proxy instance is received from the first user device and forwarded to a second user device. The third message is encrypted using the second symmetric key and signed using a first device private key that corresponds to the first user device.

Figure 23:
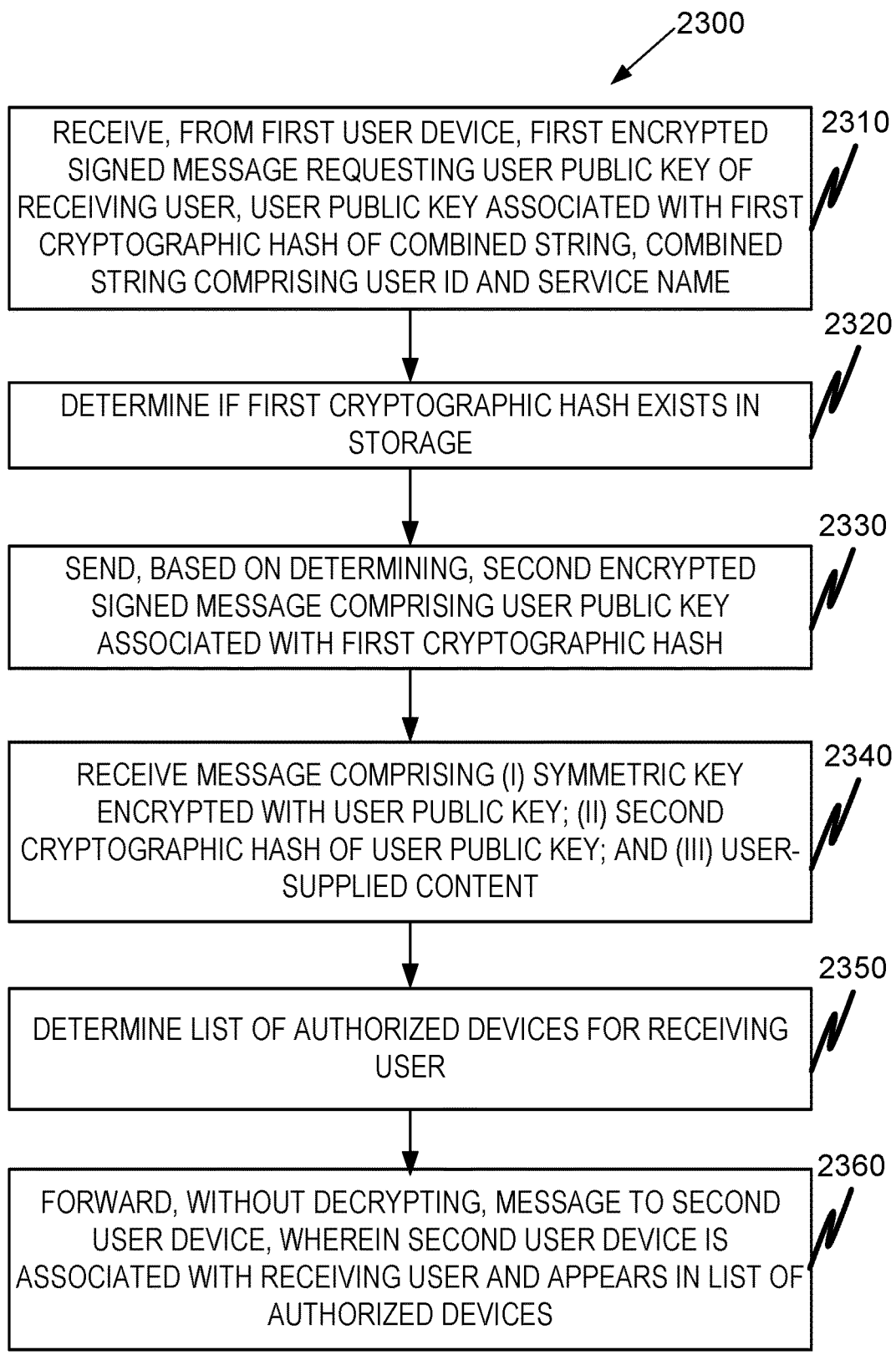
FIG. 23 is a flow diagram depicting a method for facilitating communication between users is presented.

FIG. 23 is a flow diagram 2300 depicting a method for facilitating communication between users is presented. At 2310, a first encrypted signed message requesting a user public key of a receiving user is received from a first user device. The user public key is associated with a first cryptographic hash of a combined string. The combined string comprises a user ID and a service name. At 2320, whether the first cryptographic hash exists in storage is determined. A second encrypted signed message comprising the user public key associated with the first cryptographic hash is sent based on the determining at 2330. At 2340, a message comprising (i) a symmetric key encrypted with the user public key; (ii) a second cryptographic hash of the user public key; and (iii) user-supplied content is received. At 2350, a list of authorized devices for the receiving user is determined. The message is forwarded, without decrypting, to a second user device at 2360. The second user device is associated with the receiving user and appears in the list of authorized devices.

The systems and methods presented herein provide several advantageous features. Ephemeral, single-use-only platform as a service (PaaS) instances are used for key exchange in a way that guarantees that no user private key information traverses the primary system servers, is not commingled with any other user's private key information, and exists on a user's personally-controlled devices for the few moments it takes to ensure successful transfer to another device owned by the user.

The storing and retrieving users' various public keys by way of referencing a cryptographic hash of the user's account name and associated service ensures that there is no record on the system server of the names of accounts a user has associated with the service. Even if the system server becomes compromised, a hacker could not associate which third-party service accounts are associated with which secure communications application user accounts.

The combination of unique device key pairs with unique user-account key pairs allows private keys to be safely transferred from one device to another across the open internet without risk of compromise.

The use of familiar workflows such as "friend-request"-style interactions to facilitate key exchange between users allows for cryptographic integrity to be established without interfering with the user's ease-of-use.

Using a native application running on a device as a selective web proxy so that traffic being sent to publicly-accessible websites from the user's browser can be intercepted and encrypted prior to the traffic leaving the user's computer. Similarly, content being downloaded to the user's browser can be inspected for encrypted content and decrypted in-stream, so that the user's experience is the same as if no encryption were in use.

The use of a historical key-store, which retains previous versions of a user's private keys, but encrypted with the device's current key, allows a user to access old content that was encrypted using previous keys, while allowing keys to be updated and changed at any time to prevent compromise through loss. In addition, the use of cryptographic hashes of encryption keys in the key store, and accompanying transmitted/stored encrypted data, indicate which key out of a set of many should be used for decrypting a given data set.

Examples have been used to describe the invention herein, and the scope of the invention may include other examples.

It is claimed:

1. A method for automatically disseminating a private key, the method comprising:
   receiving, from a first user device, a first message requesting a key proxy instance, wherein the first message comprises a first symmetric key;
   decrypting the first message using the first symmetric key;
   directing, based on a first device public key that corresponds to the first user device, a key proxy server to allocate the key proxy instance for communication with the first user device;
   receiving, from the key proxy server, a unique URL that corresponds to the key proxy instance;
   sending, to the first user device, a second message comprising the unique URL, wherein the second message is encrypted using the first symmetric key and signed using a server private key;
   forwarding, to a second user device, a third message comprising the unique URL of the key proxy instance received from the first user device, wherein the third message is encrypted using a second symmetric key generated by the first user device and signed using a first device private key that corresponds to the first user device;
   wherein:
      the first user device is configured to securely transmit a bundle of private keys to the key proxy instance in a fourth message via the unique URL for download by the second user device;
      the first user device is configured to send a fifth message comprising the unique URL of the key proxy instance;
      the fifth message is encrypted using a third symmetric key;
      the fifth message is signed using the first device private key;
      a second user private key is encrypted using the third symmetric key; and
      the third symmetric key is encrypted using a second device public key.

2. The method of claim 1, wherein the first message is signed with the first device private key and encrypted using the first symmetric key.

3. The method of claim 2, wherein the first symmetric key is encrypted using a server public key.

4. The method of claim 1, wherein the fourth message comprises the second symmetric key and an encrypted key bundle, wherein:
   (i) the fourth message is signed with the first device private key;
   (ii) the encrypted key bundle comprises a plurality of user private keys encrypted with the second symmetric key; and
   (iii) the second symmetric key is encrypted with the second device public key; and
   send the fourth message to the key proxy instance over a first connection, wherein the first connection is established using the unique URL.

5. The method of claim 1, wherein the second user device is configured to:
   decrypt the third symmetric key using a second device private key;
   decrypt the unique URL using the third symmetric key; and
   send a signed request for key download to the key proxy instance over a second connection, wherein the signed request is signed with the second device private key, and wherein the second connection is established using the unique URL.

6. The method of claim 5, wherein the key proxy instance is further configured to:
   send the third symmetric key to the second user device when a second signature in the signed request matches at least one device public key.

7. The method of claim 6, wherein the second user device is further configured to:
   decrypt the third symmetric key using the second device private key; and
   decrypt an encrypted key bundle using the third symmetric key.

8. The method of claim 1, wherein the key proxy instance is configured to transmit a sixth message comprising an encrypted key bundle when a first signature of the fourth message matches the first device public key.

9. A system for automatically disseminating a private key, the system comprising:
   a first user device;
   a second user device;
   a server comprising one or more hardware data processors having memory storing instructions that execute the steps of a method, the method comprising:
      receiving, from a first user device, a first message requesting a key proxy instance, wherein the first message comprises a first symmetric key;
      decrypting the first message using the first symmetric key;
      directing, based on a first device public key that corresponds to the first user device, a key proxy server to allocate the key proxy instance for communication with the first user device;
      receiving, from the key proxy server, a unique URL that corresponds to the key proxy instance;
      sending, to the first user device, a second message comprising the unique URL wherein the second message is encrypted using the first symmetric key and signed using a server private key;
   forwarding, to a second user device, a third message comprising the unique URL of the key proxy instance received from the first user device, wherein the third message is encrypted using a second symmetric key generated by the first user device and signed using a first device private key that corresponds to the first user device,
   wherein:
      the first user device is configured to securely transmit a bundle of private keys to the key proxy instance in a fourth message via the unique URL for download by the second user device;
      the first user device is configured to send a fifth message comprising the unique URL of the key proxy instance;
      the fifth message is encrypted using a third symmetric key;
      the fifth message is signed using the first device private key;
      a second user private key is encrypted using the third symmetric key; and
      the third symmetric key is encrypted using a second device public key.

10. The system of claim 9, wherein the first message is signed with the first device private key and encrypted using the first symmetric key.

11. The system of claim 10, wherein the first symmetric key is encrypted using a server public key.

12. The system of claim 9, wherein the fourth message comprises a second symmetric key and an encrypted key bundle, wherein:
   (i) the fourth message is signed with the first device private key;
   (ii) the encrypted key bundle comprises a plurality of user private keys encrypted with the second symmetric key; and
   (iii) the second symmetric key is encrypted with the second device public key; and
   send the fourth message to the key proxy instance over a first connection, wherein the first connection is established using the unique URL.

13. The system of claim 9, wherein the second user device is configured to:
   decrypt the third symmetric key using a second device private key;
   decrypt the unique URL using the third symmetric key; and
   send a signed request for key download to the key proxy instance over a second connection, wherein the signed request is signed with the second device private key, and wherein the second connection is established using the unique URL.

14. The system of claim 13, wherein the key proxy instance is further configured to:
   send the third symmetric key to the second user device when a second signature in the signed request matches at least one device public key.

15. The system of claim 14, wherein the second user device is further configured to:
   decrypt the third symmetric key using the second device private key; and
   decrypt an encrypted key bundle using the third symmetric key.

16. The system of claim 9, wherein the key proxy instance is configured to transmit a sixth message comprising an encrypted key bundle when a first signature of the fourth message matches the first device public key.

17. A system comprising:
   means for receiving, from a first user device, a first message requesting a key proxy instance, wherein the first message comprises a first symmetric key;
   means for decrypting the first message using the first symmetric key;
   means for directing, based on a first device public key that corresponds to the first user device, a key proxy server to allocate the key proxy instance for communication with the first user device;
   means for receiving, from the key proxy server, a unique URL that corresponds to the key proxy instance;
   means for sending, to the first user device, a second message comprising the unique URL, wherein the second message is encrypted using the first symmetric key and signed using a server private key;
   means for forwarding, to a second user device, a third message comprising the unique URL of the key proxy instance received from the first user device, wherein the third message is encrypted using a second symmetric key generated by the first user device and signed using a first device private key that corresponds to the first user device;
   wherein:
      the first user device is configured to securely transmit a bundle of private keys to the key proxy instance in a fourth message via the unique URL for download by the second user device;
      the first user device is configured to send a fifth message comprising the unique URL of the key proxy instance;
      the fifth message is encrypted using a third symmetric key;
      the fifth message is signed using the first device private key;
      a second user private key is encrypted using the third symmetric key; and
      the third symmetric key is encrypted using a second device public key.

18. The system of claim 17, wherein the fourth message comprises the second symmetric key and an encrypted key bundle, wherein:
   (i) the fourth message is signed with the first device private key;
   (ii) the encrypted key bundle comprises a plurality of user private keys encrypted with the second symmetric key; and
   (iii) the second symmetric key is encrypted with the second device public key; and
   send the fourth message to the key proxy instance over a first connection, wherein the first connection is established using the unique URL.

19. The system of claim 18, wherein the key proxy instance is configured to transmit a sixth message comprising an encrypted key bundle when a first signature of the fourth message matches the first device public key.

* * * * *